(12) United States Patent
Debets et al.

(10) Patent No.: US 10,394,419 B2
(45) Date of Patent: Aug. 27, 2019

(54) DEVICE, A METHOD AND A SERVER FOR RETRIEVING INFORMATION USING A MACHINE READABLE IMAGE

(71) Applicant: GSPI B.V., Reithoven (NL)

(72) Inventors: Anneloes Debets, Hoensbroek (NL); Jos van Esch, Reithoven (NL)

(73) Assignee: GSPI B.V., Riethoven (NL)

( * ) Notice: Subject to any disclaimer, the term of this patent is extended or adjusted under 35 U.S.C. 154(b) by 710 days.

(21) Appl. No.: 14/648,603

(22) PCT Filed: Dec. 1, 2013

(86) PCT No.: PCT/EP2013/003619
§ 371 (c)(1),
(2) Date: May 29, 2015

(87) PCT Pub. No.: WO2014/082753
PCT Pub. Date: Jun. 5, 2014

(65) Prior Publication Data
US 2015/0317060 A1 Nov. 5, 2015

(30) Foreign Application Priority Data

Dec. 1, 2012 (EP) .................................... 12008075
May 16, 2013 (EP) .................................... 13002566

(51) Int. Cl.
*G06F 3/0482* (2013.01)
*G06F 3/0484* (2013.01)
(Continued)

(52) U.S. Cl.
CPC ........ *G06F 3/04817* (2013.01); *G06F 3/0482* (2013.01); *G06F 3/04842* (2013.01);
(Continued)

(58) Field of Classification Search
CPC .. G06F 3/04817; G06F 3/0482; G06F 3/0481; G06F 3/0484
See application file for complete search history.

(56) References Cited

U.S. PATENT DOCUMENTS 5,774,133 A * 6/1998 Neave ..................... G06T 17/00
345/441
6,098,883 A * 8/2000 Zocca ...................... G06K 7/14
235/462.25

(Continued)

FOREIGN PATENT DOCUMENTS

CN 101930532 A 12/2010

OTHER PUBLICATIONS

International Search Report in priority PCT Application No. PCT/EP2013/003619, dated Jul. 22, 2014.

*Primary Examiner* — Jennifer N To
*Assistant Examiner* — Ashley M Fortino
(74) *Attorney, Agent, or Firm* — Troutman Sanders LLP; Ryan A. Schneider; Christopher Close, Jr.

(57) ABSTRACT

Icons/text/images representing selections areas are placed near a machine readable image to for retrieving an information item about a product to which the machine readable image is associated. These selection areas can be visually represented by icons/text/images that inform the user what information will be retrieved or what action will be controlled if selected. A capturing device captures a machine readable image together with icons/text/images representing selections areas, displays these on the screen for the user to select one of the icons/text/images. The capturing device calculates the coordinates of the selection relative to the machine readable image using a unit of distance and perspective correction derived from the machine readable image. These coordinates are provided to an information (Continued)

server associated with the machine readable image which in turn provides the information associated to the coordinates to the capturing device.

13 Claims, 12 Drawing Sheets

(51) Int. Cl.
    *G06F 3/0481*     (2013.01)
    *G06F 16/955*     (2019.01)
    *G06Q 30/02*     (2012.01)
    *G06K 7/10*     (2006.01)

(52) U.S. Cl.
    CPC ..... *G06F 16/9554* (2019.01); *G06Q 30/0267* (2013.01); *G06K 2007/10514* (2013.01)

(56) References Cited

U.S. PATENT DOCUMENTS

| | | | |
|---|---|---|---|
| 2010/0155464 A1* | 6/2010 | Swayn | G06K 7/14 235/375 |
| 2013/0070099 A1* | 3/2013 | Gellaboina | G06K 9/00 348/160 |
| 2014/0082515 A1* | 3/2014 | Baalu | G06F 3/0481 715/745 |
| 2014/0115708 A1* | 4/2014 | Terwilliger | G06F 21/36 726/26 |
| 2014/0359497 A1* | 12/2014 | Lee | G06F 3/0488 715/764 |

* cited by examiner

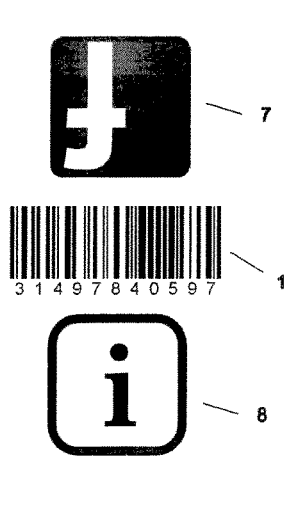
Fig. 4a
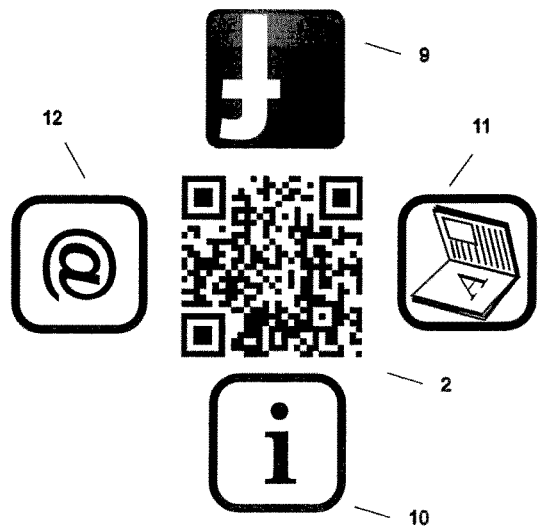
Fig. 5
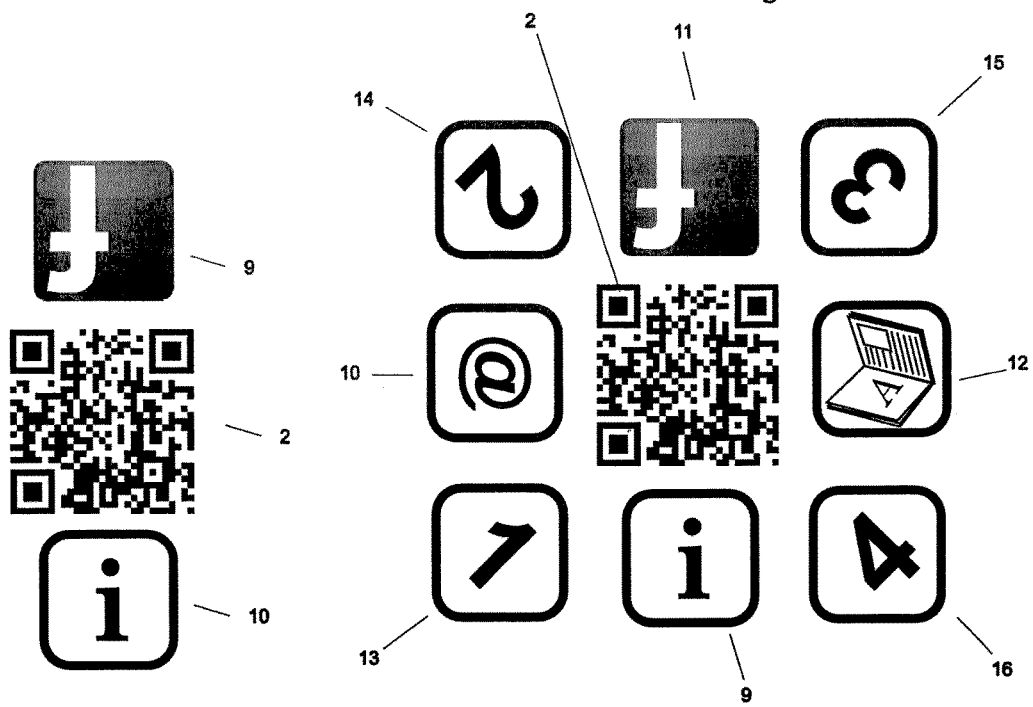
Fig. 4b
Fig. 6

DEVICE, A METHOD AND A SERVER FOR RETRIEVING INFORMATION USING A MACHINE READABLE IMAGE

CROSS-REFERENCE TO RELATED APPLICATIONS

This application is a US National Stage of International Application No. PCT/EP2013/003619 filed 1 Dec. 2013, which claims the benefit of EP 12008075.9 filed 1 Dec. 2012 and EP 13002566.1 filed 16 May 2013, each herein fully incorporated by reference.

TECHNICAL FIELD OF THE INVENTION

The invention relates to a machine readable image for retrieving an information item represented by an icon associated to the machine readable image using the machine readable image, to a device for retrieving information represented by an icon associated to a machine readable image comprising capturing means for capturing the machine readable image and the icon and a screen for displaying the machine readable image and the icon, to a method for selecting information represented by an icon associated to a machine readable image comprising the steps of capturing the machine readable image and the icon and displaying the machine readable image and the icon on a screen and to an information providing server comprising: a receiver for receiving from a client a coordinate corresponding to an icon associated to a machine readable image.

BACKGROUND ART

Machine readable images in the form of a QR code represent either a URL, text, an SMS message to be sent, a product number, an inventory code, an expiration date or a phone number to be called. This machine readable image is captured by a device comprising a capturing device. Examples of such devices are mobile phones, handheld scanners, organizers, photo and video cameras, tablets, terminals, computing devices, and MP3 players. Formerly confined to industrial uses, they have in recent years become common in consumer advertising and packaging, because the dissemination of smart phones "has put a barcode reader in everyone's pocket" for the first time. As a result, the QR code has become a focus of advertising strategy, since it provides quick and effortless access to the brand's website.

Many of these applications target mobile phone users (via mobile tagging). Users may receive text, add a vCard contact to their device, open a Uniform Resource Identifier (URI), or compose an e-mail or text message after capturing QR Codes. They can generate and print their own QR Codes for others to capture and use by visiting one of several pay or free QR Code-generating sites or apps. Apps for capturing QR Codes can be found on nearly all smart phone devices.

QR Codes storing addresses and Uniform Resource Locators (URLs) appear in magazines, on signs, on buses, on business cards, or on almost any object about which users might need information. Users with a camera phone equipped with the correct reader application can capture the image of the QR Code to display text, contact information, connect to a wireless network, or open a web page in the telephone's browser. This act of linking from physical world objects is termed hardlinking or object hyperlinking. QR Codes may also be linked to a location to track where a code has been captured. Either the application that scans the QR Code retrieves the geo information by using GPS and cell tower triangulation or the URL encoded in the QR Code itself is associated with a location.

The QR code is readable from any direction in 360°. QR Code is capable of 360 degree (omni-directional), high speed reading. QR Code accomplishes this task through position detection patterns located at three corners of the symbol. These position detection patterns guarantee stable high-speed reading, circumventing the negative effects of background interference.

Custom or artistic QR codes are standard QR codes that have been modified for aesthetic purposes or to make it easier for people to recognize a brand. Many companies use different design techniques to help their code stand out among the crowd. These techniques include: adding color, shapes and various techniques such as round or pointed edges.

U.S. Pat. No. 5,726,435 discloses a 2 dimensional machine readable code, a so called 2D barcode. To properly decode the information stored in the 2D Barcode U.S. Pat. No. 5,726,435 discloses in FIG. 3 and the associated description an apex detection to determine the actual tilt angle of the 2D barcode.

The teaching of how to obtain this apex and thus the tilt angle of the 2D barcode provided in U.S. Pat. No. 5,726,435 is incorporated by reference. Many other methods of determining a tilt angle of an object in general are known and can be applied. Common to all these methods, including the one disclosed in U.S. Pat. No. 5,726,435 is that in order to correct the rotational offset the tilt angle must be determined before applying the correction in order to obtain a proper upright version of the 2D barcode before commencing the decoding process.

The decode preprocessing includes tilt angle detection and coordinate conversion processing, both of which are mandatory when each two-dimensional code is randomly placed with an uncertain tilt angle with respect to a reading device.

Machine readable codes are associated with either a URL, text, an SMS message to be sent or a phone number to be called. The URL, text, SMS message including the destination or the telephone number are obtained by decoding the machine readable code. The machine readable codes such as 2 dimensional codes have a fixed, limited amount of data that can be stored in them. Consequently only a single URL, text, SMS message or phone number is currently stored in the machine readable codes. This results in multiple Machine readable codes having to be used when multiple items relating to a single article are to be conferred to the user.

For instance a television set advertisement may have a machine readable code comprising a URL pointing to a web site with more details (specifications, images) of the television set than the advertisement can provide in the limited space. An additional machine readable code is required to provide a URL for the user manual or to locate a dealer.

DISCLOSURE OF THE INVENTION

It is an objective of the present invention to give the customer direct access to information that interests him.

To achieve this objective the device comprises:
a processor for determining an orientation of the machine readable image and for determining a coordinate representing a selected icon based on a rotation angle between the selected icon and the machine readable image;

a communication interface for forwarding the coordinate to an information provider and receiving information represented by the selected icon from the information provider.

Next to the machine readable image selection areas are located that each represent different information items that can be retrieved or different actions that can be controlled. These selection areas can be visually represented by icons/text/images that inform the user what information item will be retrieved or what action will be controlled if selected.

As the icons are positioned around the machine readable image, each icon can be represented by the rotation angle between the icon and the machine readable image as the machine readable image has a orientation that is defined as normal or upright.

Using the machine readable image as a reference for determining the rotation angle to be sent to the information server ensures that regardless of the orientation in which the user holds the device during capture, the rotation angle will be consistently derived.

This rotation angle can subsequently be used to identify which icon was selected by the user and the information item corresponding to this selection can be retrieved. As the rotation angle is transmitted to the information server, the information server can perform a translation from received angle to information item, so that the capturing device does not need to do this.

In an embodiment of the device the coordinate processor is also arranged for deriving a unit of distance from the captured machine readable image and for determining the coordinate representing the selection based on the received user input, the orientation of the machine readable image and the derived unit of distance.

By deriving a unit of distance and expressing all distances in this unit of distance and including the distance in the coordinate it is no longer relevant at what magnification the machine readable image and icons are captured.

The captured image comprising both machine readable image and selection areas represented by icons, images or text are all subject to the same magnification and distortion.

This allows the capturing device to establish Cartesian or polar coordinates of the selected selection area on the touch screen where the Cartesian or polar coordinates are independent of the tilt angle and zoom level/magnification/distance from capturing device to image to be captured. As the capturing device is able to thus standardize the coordinates to be transferred to an information server, the information server no longer needs to handle scaling issues introduced by the capturing process.

'Icons' in the context of this description are icons/text/images representing selection areas. 'Machine readable images' in the context of this description are images that can be recogized by a capturing device and that directly or indirectly yield a pointer to information item on an information server.

In an embodiment of the device the coordinate is a polar coordinate.

Using polar coordinates ensures compatibility with a simplified system where the selection is only based on rotation angle and where distance is irrelevant. The present application also provides an enhanced system providing distance information on top of the rotation angle information.

In a further embodiment of the device the polar coordinate comprises a distance expressed in the derived unit of distance from a predefined point of the machine readable image.

Using the machine readable image as a reference for determining the rotation angle to be sent to the information server ensures that regardless of the orientation in which the user holds the device during capture, the normal upright position of the machine readable image can be determined and subsequently the rotation angle between the selected icon and the machine readable image will be consistently derived from the selection made by the user on the touch screen.

As the distance is expressed in the derived unit of distance, any scaling is automatically corrected as both the machine readable image, the icons and the distances between each other scale proportionally and distances between them remain constant when expressed in the unit of distance derived from the machine readable image. This ensures that the information server does not need to handle scaling corrections.

For such corrections to be handled by the information server the captured image would have to be transferred to and processed by information server while the capturing device has this information automatically available because of the decoding of the machine readable image such as a QR code. The capturing device thus effectively normalizes the coordinate before sending.

In an embodiment the device comprises perspective correction means comprising perspective distortion detection means for deriving perspective correction information from the machine readable image and perspective distortion correction means for applying a perspective correction to the captured image based on the perspective correction information.

This ensures that the information server does not need to handle perspective corrections. For such corrections the captured image would otherwise have to be transferred to and processed by information server while the capturing device has this information automatically available because of the decoding of the machine readable image such as a QR code.

The capturing device determines the perspective correction information to be able to perform the perspective correction of the machine readable image in order to correctly decode or recognize the machine readable image such as a QR code and applies the same perspective correction to the entire captured image. This ensures that the coordinates of a selection indicated by the user by touching an area on the touch screen is also corrected for the potential perspective distortion introduce by the capturing process. As the Machine readable image is part of the overall captured image the perspective correction required for the machine readable image when applied to the entire captured image will yield a near perfect correction for the entire captured image.

When the machine readable image is a QR code the central processing unit uses at least two of the three orientation references in the upper left corner, upper right corner and lower left corner to determine the normal upright position of the QR code. Advantageously a set of two orientation references is chosen so that a line connecting the two orientation references is, at a 0 degree rotation angle of the QR code, at a 0 degree angle relative to the indication of 0 degrees reference (either an arrow in the display, or an indicated or predetermined edge of the display).

Another use of the three orientation references is to determine the perspective distortion of the QR code.

The software running on the capturing device, or a dedicated hardware implementation captures the QR code, determines the rotation angle, decodes the QR code and attaches the rotation angle to the information stored in the QR code. In an enhanced implementation the device also determines and corrects for perspective distortion and determines the distance on the touch screen from the center of the QR code to the touched area based on units of distance derived from the dimensions of the QR code as detailed below.

In order to enable the capturing device distinguish a regular QR code from a QR code according to the invention, an identifier is appended to the URL stored in the QR code:
www.mywebsite.com?qtwist=1

Once the capturing device decodes the captured QR code it detects the presence of the parameter qtwist, which indicates that the capturing device has to determine the rotation angle (and if in a touch screen mode the distance from the touched location to the center of the QR code) and append the results to the URL before sending it to the issuer's server. The mere presence of the qtwist parameters thus indicates to the device the need to append parameters according to the invention. The value of the qtwist parameter is set by the issuer of the QR code such as the manufacturer of a product or the operator of the information server.

An example of a URL where the angle is appended:
www.mywebsite.com?qtwist=0&angle=42

An example of a URL where the angle and distance is appended:
www.mywebsite.com?qtwist=0&angle= 42&distance=1.305

In the touch screen embodiment of the capturing device, additional parameters can be appended such as pressure of the touch, duration of the touch, distance and direction over which the touched location moved during touch.

As a service to the issuer of the QR code a service can be offered based on this technology where the information items are hosted on an information server which is not owned/operated by the issuer of the QR code but by a service provider.

To this end the URL stored in the QR code is modified in that the parameter qtwist is assigned a value different from 0:
www.mywebsite.com?qtwist=1&angle=42&distance=1.305 when the capturing device detects that the parameter qtwist has the value 1 it replaces the issuer's domain name with the service provider's domain name:
www.qtwist.com?qtwist=1&angle=42&distance=1.305

If the service provider services many different companies, the qtwist parameter is no longer limited to 0 and 1 but can have any integer value assigned. In that case qtwist=0 still indicates to the capturing device that the issuer's domain name must not be replaced, and values other than 0 are specific for companies or campaigns of companies. For instance the qtwist=10 is assigned to company N, while the qtwist=11 is assigned to company M. As the set of integers that can be included is only limited by the capacity of the QR code, a large number of companies and their campaigns can be supported.

Thus the URL:
www.mywebsite.com?qtwist=10&angle=42&distance=1.305
is interpreted by the capturing device as follows:
qtwist=10 means that www.mywebsite.com must be replaced by the service provider's domain name for example www.qtwist.com. This results in a URL of:
www.qtwist.com?qtwist=10&angle=42&distance=1.305
being sent onto the internet.

When the service provider's server receives the URL it looks at the value of the qtwist parameter.

In the present case the value is 10 indicating that the URL was derived from a QR code issued by company N. The server subsequently uses a script that interprets the rotation angle (and if appropriate the distance and other parameters) and subsequently provides the information item of company N that it has stored on the service provider's server, or redirects the request to the server of company N.

This way company N does not need to process the parameters, nor adapt its server to deal with the enhanced QR code of the present invention.

If the issuer of the QR code prefers to handle the parameters themselves, for instance because valuable or sensitive information can be derived from the parameters, the qtwist parameter is set to 0 and all requests are directed to and handled by the website indicated in the QR, not by the service provider.

An additional advantage of this is that a prior art capturing device, not aware of the additional parameters, will capture the QR code:
www.mywebsite.com?qtwist=0
or
www.mywebsite.com?qtwist=1
and will send this URL to the internet were it will automatically end up at the server of the issuer. As that server is not aware of the existence/meaning of the qtwist parameter this part of the string is ignored resulting in the main page of www.mywebsite.com being provided. This ensures backward compatibility of the QR codes of the present invention with the existing infrastructure. The additional parameter ?qtwist=0 or ?qtwist=1 is automatically and safely ignored by the issuer's server as part of the regular parsing of URL strings.

If the issuer desires to direct users to a particular page on his server, he can modify the URL as follows:
www.mywebsite.com/product1?qtwist=0
which directs the prior capturing device to the web page of product1 on the server. The ?qtwist=0 part of the URL is received by the issuer's server and ignored resulting in:
www.mywebsite.com/product1
ensuring compatibility.

When a capturing device according to the invention encounters a QR code with the URL stored in it:
www.mywebsite.com/product1?qtwist=0
the capturing device appends the various parameters
www.mywebsite.com/product1?qtwist=0&angle=123&distance= 1.450&pressure=0.82

When a capturing device according to the invention encounters a QR code with the URL
www.mywebsite.com/product1?qtwist=10
it replaces the issuer's domain name with the service providers domain name and appends the various parameters:
www.qtwist.com/product1?qtwist=10&angle=123&distance= 1.450&pressure=0.82

This results in the service provider providing the information item of product 1 of company N associated with the indicated angle and distance and pressure.

If a machine readable image other than a QR code is used it is possible that the information needed cannot be derived directly from the machine readable image but the machine readable image has to be submitted to a server for processing (such as a image search engine). The server subsequently returns information about the website the submitted image is associated to the capturing device and the capturing device subsequently attaches the rotation angle indication and if applicable distance and pressure information.

A machine readable image can also be a text such as a URL, of course surrounded by icons/text/images representing selection areas.

As the orientation of the machine readable text can be detected the orientation of the icons and distance are be detected relative to the machine readable text.

It is evident that that icon/text/image representing a selection area need not be recognized nor machine readable as they only indicate a selection area so the user knows where to touch the touch screen or how to rotate the capturing device. The capturing device only displays the icons/text/images representing selection areas on its touch screen as part of the captured image but is not aware of the presence of these icons/text/images representing selection areas. It is the user that uses the icons/text/images representing a selection areas and touches one of the icons/text/images on the touch screen to make the selection. The capturing device needs only be aware of the machine readable image and calculates the coordinates of the user touch input relative to the machine readable image, while using the machine readable image to establish a unit of distance and correct perspective distortion.

The present invention reduces traffic to and from a device because instead of landing on one particular page and then navigating to the desired information item, such as the user manual, the user can select for instance a user manual directly by capturing the machine readable image such as a QR code and subsequently touching the user manual icon on the touch screen of the scanning device.

Alternatively, when the capturing device is used by rotating the capturing device relative to the machine readable image to indicate a selection, the user manual icon is (visually) selected and subsequently the QR code is captured at a rotation angle. That rotation angle is determined and passed on to the server which, based on that angle (and the implicit knowledge that the user thus desired to get directed to the user manual page) provides the user manual page directly without forcing the user to access other pages and navigate on screen to the user manual page.

The present invention also substantially reduces traffic compared to services that rely on image recognition of an entire add by the capturing device. To achieve such recognition a recognition file holding recognition supporting information about the set of recognizable images must be uploaded to the capturing device and must be kept up to date when recognizable images are added. This means that the recognition supporting information must be kept in the capturing device. The update of the recognition supporting information further delays the start of the capturing and selection process if performed when the application on the capturing device is started. Furthermore the recognition of machine readable images such as a QR code is both faster and more reliable then attempting to recognize any image to find out whether it is part of the fixed set of adds. Both the traffic requirements and the storage requirements also hinder scaling of such principle. As the present information does not require any recognition supporting information a priori being present in the capturing device it does not suffer from such scaling issues. In addition, the device of the present application typically yield information (the information stored in the machine readable image such as a URL) instead of requiring information to enable recognition.

It allows the issuer of the machine readable image to direct the traffic to the appropriate server without depending on third parties to include recognition supporting information in their recognition file. Requiring recognition supporting information in a recognition file further implies that only the third party's application on the capturing device is able to recognize the add.

Contrary to this, the device of the present application can be implemented in any machine readable image capturing application of any vendor as they do not require such a priori recognition supporting information.

As stated above, the only limitation is in the length of the qtwist parameter to indicate campaigns/products/manufacturers and is thus only limited by the chosen capacity of the QR code or other machine readable image with information stored therein/derivable from.

The QR standard ISO/IEC18004 details the recognition of the QR code and the decoding is explained in detail in chapter 12 (overview) and chapter 13 (steps). Both chapters are incorporated by reference and are being referred to throughout the description.

When in step 5 of chapter 13 the nominal dimension of the modules of the symbol is determined, this can be used as a unit of distance. In this case the unit of distance is the minimum length/width of a dark module respectively light module in the QR symbol. This provides a smal unit of distance which allows other distances to be expressed as an integer multiple of the module size of the QR code.

When expressing other distances on the screen of the capturing device in these units of distance, where a single unit is equal to the module size of the QR code, this other distance becomes independent of the on-screen size of the QR code.

Alternatively the distances on the screen of the capturing device can be expressed in units of distance, where a single unit is equal to D, this distance becomes independent of the on-screen size of the QR code.

Alternatively, a unit of distance of D/10 can be chosen.

According to chapter 10.2 Human-readable interpretation of the QR standard, because QR Code symbols are capable of encoding thousands of characters, a human readable interpretation of the data characters may not be practical. As an alternative, descriptive text rather than literal text may accompany the symbol. The character size and font are not specified, and the message may be printed anywhere in the area surrounding the symbol. The human readable interpretation should not interfere with the symbol itself nor the quiet zones.

In addition, when using a touch screen to have the user indicate the icon he selects by touching the touch screen, the distance from a fixed reference point related to the position of the QR code (such as the center of the QR code, or one of the orientation references of the QR code) can be determined and passed on to the server, just like the rotation angle. When sent together the server can determine the exact location of the touched area on the touch screen.

First the orientation of the QR code is determined and a 0 degree reference is established. At this point, when the Position Detection Patterns have been recognized, the size of the QR code can easily be established as detailed above.

This distance derived from the QR code can subsequently be used to establish distances on the touch screen as any distance can now be expressed in units.

The angle of rotation can be determined with 1 degree accuracy and this opens up additional possibilities.

http://www.qtwist.com? angle=209

A PHP/Python/Perl script on the information server extracts the value of the variable 'angle' using for instance the $_GET command.

The value of 'angle' is subsequently used to control the destination of the request.

In the case of:

www.qtwist.com/product1?qtwist=10&angle=123&distance= 1.450&pressure=0.82 a PHP/Python/Perl script on the information server extracts the value of the variables 'qtwist', 'angle', 'distance' and 'pressure' using for instance the $_GET command.

The values of 'qtwist', 'angle', 'distance' and 'pressure' are subsequently used to control the destination of the request.

As the server knows the angle range which corresponds to a particular icon, the server can derive information about the accuracy of scanning by the user from the various received angle indications.

In case of a more varied positioning or shapes of the icons the server can derive information about the accuracy of scanning by the user from the various received angle and distance indications.

A pattern is then established, allowing information about the user to be deducted. This can be used for identification purposes (changes in accuracy patterns over a series of QR captures indicate a change of user, device stolen, device occasionally operated by friends/family?) and for marketing purposes as it is one more parameter identifying a particular user.

Since the granularity of the determination of the rotation angle is good, it can also be employed for games. A user can gain access to a hidden part of a web site when the QR code is scanned at a particular sequence of angles, each time sending a URL to the server, which, if the correct angle (and if desired: distance/pressure) is provided, allows access to the next page where yet another angle (and if desired: distance/pressure) is expected. When the sequence is successfully completed the user is rewarded, for example with a rebate coupon. As varying ranges can be established (enabled by the one degree accuracy), access can be tuned, allowing the user the margin of error in the positioning of the scanning device as desired by the operator of the server/website.

An important issue is backward compatibility. When a regular QR code is captured, the angle indicator is preferably not added to the communication with the server, even though at first instance it is not expected to affect the communication with a server that is not arranged to handle the additional information as provided by the present invention.

To prevent potential problems, the QR code is generated with a parameter included that indicates to the scanning device that the addition of the angle and other control elements is desired.

An example of a URL stored in the QR code implementing this is:

http://www.mywebsite.com?a=y&d=n where the parameter a=y indicates to the scanning device that the issuer of the QR code requests the angle parameter to be passed to the server but the distance parameter should not be passed to the server.

In this case the scanning device recognizes the a=y parameter and replaces it with 'angle=209', resulting in a URL of:

http://www.mywebsite.com?angle=209

Alternatively, to save room the presence of a letter in a string of letters can be used to indicate what parameters should be added:

www.mywebsite.com/product1?qtwist=10&p=adp
resulting in the URL:
www.qtwist.com/product1?qtwist=10&angle=123&distance= 1.450&pressure=0.82
while
www.mywebsite.com/product1?qtwist=10&p=a results in the URL:
www.qtwist.com/product1?qtwist=10&angle=123

Note that there if no qtwist parameter is included the scanning device preferably should not attach parameters to the URL ensuring compatibility with ordinary QR codes without the enhancement of the present invention.

To simplify this principle even further, the scanning device can even just replace the 'y' in 'a=y' with the angle value '209': http://www.qtwist.com?qtwist=10&a=209 resulting in a shorter URL which still allows 26 unique parameters (A through Z) to be passed to the server and reducing the string manipulation requirements for the capturing device.

With just a limited set of parameters a full control mechanism can be established that is extremely flexible in allowing the issuer of the QR code & icons to create access to information item or controls/settings as the icons merely assist the user to perform the proper operations (capture QR and if required effect a control operation) and the interpretation is performed on the server side, reducing the processing burden for the scanning device as the scanning device need not know what icons are present and what information items/controls/settings are available on the server. Yet, corrections are performed by the capturing device base don knowledge gained from the decoding process so as to ensure a standardized set of parameters being submitted.

It is the issuer of the QR code&icons that establishes the relationships and sets the proper interpretation by the server of the received standard (sub) set of parameters but does not have to handle zoom levels/magnification/distance from capturing device to captured image. Examples of the set of parameters that can be advantageously used are:

a: Angle
v: Vector (angle2 & magnitude)
x: X coordinate (0.0 is center of QR code, X axis: parallel to line through two upper orientation references)
Y: Y coordinate (0.0 is center of QR code, Y axis: parallel to line through two left orientation references)
p: Pressure
d: Duration (of single touch, constant position or duration of move)
dx: (change in x coordinate between first and second touch)
dy: (change in y coordinate between first and second touch)
z: Zoom factor (change in size of QR between first and second scan)
c: control yes/no
s: Security Not the full 360 degrees around the QR code need to be used.

The range can be limited to 180 degrees or even 120 degrees, while still offering a significant number of selections and at the same time matching the natural range of rotation around the wrist motion of the human hand. Half circle arrangement of icons, left above and right side of the QR code are possible because of the obtained 1 degree accuracy.

An element of randomness can be introduced by selecting very small angle ranges where special function occur. An example is the issuing of rebate coupons when the QR code is scanned at exactly 209 degrees, or between 207 and 211 degrees. This allows the company issuing the QR code to regulate the chance of success to obtain the rebate coupon from slim to broad.

As the angle is passed to the server to be processed, the server operator can:

modify the 'winning' angle after every successful/winning submission of an angle value as to prevent word of mouth spreading the winning angle and people all aiming to duplicate the winning scan.

modify the range depending on marketing objectives. Different angles/angle ranges during day/night or weekday/weekend, or geographic location (based either on user location or country/continent), or product, or weather.

Any combination of angle, distance and pressure passed to the information server can be used for the above purpose.

The change in rotation angle can be precisely be determined, allowing fine control of settings by rotation.

Rotation clockwise over a small angle results in a corresponding small increase of the setting. Rotation clockwise over a large angle results in a corresponding large increase of the setting. Rotation counter clockwise over a small angle results in a corresponding small decrease of the setting. Rotation counter clockwise over a large angle results in a corresponding large decrease of the setting. Icons/scales printed around the QR code assist the user in judging the correct amount of change. The capture can be of start and end angle (2 scans) or continuously at intervals during the rotation.

Decoding the QR code also yields a unit of distance.

When using a touch screen to have the user indicate the icon he selects by touching the touch screen, the distance from a fixed reference point related to the position of the QR code (such as the center of the QR code, or one of the orientation references of the QR code) can be determined and passed on to the server, together with the rotation angle. When both angle and distance are sent to the server, the server can determine the exact location of the touched area on the touch screen.

First the orientation of the QR code is determined and a 0 degree reference is established, either by selecting a side of the screen as a reference or by drawing a reference line through two Position Detection References of the QR code.

At this point, when the orientation references have been recognized, the size of the QR code can easily be established as the distance between the orientation references are prescribed by the QR standard.

This distance derived from the QR code can subsequently be used to establish distances on the touch screen as any distance can now be expressed in these units of distance. The parameter distance is, when expressed in these units, independent of the zoom level/magnification/distance from capturing device to captured image.

This establishment of units of distance based on the QR code results in automatic scaling of the location of the icons. The distance between the icon and the QR code scales proportional to the size of the QR code. When, because of zooming in, the QR code is displayed twice as big on the touch screen as in a reference situation, the distance between the QR code and the icon is also twice as big as in the reference situation. Thus by establishing a unit of distance based on the QR code, the measured distance between the QR code and the icon can be easily corrected to return distance information to the server that is independent of the actual magnification of the QR code and icons on the touch screen, as regardless of the zoom level as all distances increase/shrink in proportion when zooming in/out. The placement of the icons need not be standardized as the scanning device only establishes the location & rotation of the QR code, determines a unit of distance and determines where the user touches the touch screen and subsequently expresses the position relative to the center of the QR code in angle & units of distance, or in X & Y coordinates expressed in the units of distance derived from the QR code decoding.

As the issuer of the QR codes plus icons knows what the positions of the icons are relative to the QR code (expressed in units of distance as established by the printing size of the QR code) the server can map the received angle and distance information to the icon displayed in the area touched by the user and thus to the information item selected by the user.

The selection by the user using his finger may be any of the following or equivalent methods: touch, double tap, 2 finger zoom, pinch, swipe. In addition motion of the scanning device can be used as selection: rotation, shake, shift. Shift of the scanning device can be measured using inertia sensors as readily present in most scanning devices. Control can be exerted by moving the scanning device away from or towards the QR code & icons. This effectively allows changes in the height of the scanning device above the QR code to be translated in changes of the control or setting.

Using the inertia sensors allows the QR code to be captured once and deriving the subsequent changes to be made to the control element or setting from the movement of the scanning device without the need for continuously tracking changes in the position and size of the QR code.

When detecting a user input via the touch screen effectively two angles are determined:

the rotation angle rotation angle of the QR code in the display the angle between the 0 degree reference of the QR code and a line between the center of the QR code and the area touched on the touch pad. Both angles can either be combined into a single angle to be passed to the server, or both angles can be passed on separately (though preferably in the same communication with the server, i.e. in the same URL). The last option allows the server to either treat both angles independently or combine them into a single value. In addition the angle between the 0 degree reference of the QR code and a line between the center of the QR code and the area touched on the touch pad can be supplemented by the length of said line expressed in the units of distance determined from the QR code, thus forming vector information.

Combining the rotation angle rotation angle detection with input from the user via the touch screen which is used to capture the QR code allows gestures on the touch screen by the user. The function to be controlled is selected by scanning the QR code at the appropriate angle for selection, while the control is effected by for instance moving the finger from left to right across the touch screen to increase the control value or setting, or from right to left across the touch screen to decrease the control value or setting. Two finger gestures, circular gestures, all natural to the user, mimicking known control elements such as slides or knobs can be used.

Controls are Implemented in Various Ways:

point to icon, scan QR→issue URL

Example: go to facebook page

Point to icon indicating value, scan QR to select a value

Example: Facebook like with weighing indication (dislike, like a little, like a lot)

Point to icon, scan QR, touch to change control/setting

The scan select the heating control, the touch screen controls the change

Point to icon, scan QR, change angle, rescan QR to change control setting

The scan select the heating control, the change in angle controls the change

The angle ranges (and thus the corresponding areas the icons next to the QR code cover) can be unevenly distributed giving higher weight to certain selection options. This helps user selection of main items visually, enhances correct selection and is useful for steering consumers as a marketing tool.

Security: The QR code can be issued with a security key, which results when the QR code is scanned at an 209 degree angle in the following URL:

http://www.mywebsite.com?qtwist=10&security=s152bdkjdy2nd9oiaswnb32&angle=209

The embedded security key ensures that somebody not having the physical QR code cannot enter the protected area of the server. The angle can either be used as an additional security measure (as the user only knows and only needs to remember his personal angle, like a 3 digit PIN code) or be processed once the secure part of the server is accessed because the correct security key was part of the URL.

The touched area on the touch screen can be used not only to establish the selection by the user but also as the point of origin from which a new window or application is made to visually appear from (exploding window).

The capturing device can also project the icons around a QR code on the screen Instead of having icons around the machine readable image, it is also possible for the device to just capture the machine readable image (at any acceptable angle) after which the information in the QR code is used to contact the server. The server subsequently provides to the device the icons and information on how to retrieve the associated information. The device then detects the current position and rotation angle of the QR code and displays the icons around the QR code adjusting for the detected position and rotation angle. To the user the arrangement appears normal but is a mix of captured image comprising the QR code and generated icons which are displayed at their appropriate locations (mimicking the arrangement of FIG. 6 for example). When the device is rotated the QR code rotates on screen and the generated icons track the changes in position and rotation. When the desired rotation is reached, for instance when the desired function's icon has an upright orientation, the screen is touched (anywhere, not necessarily on the desired icon) and the selection is effectuated.

To Summarize the Invention:

Icons/text/images representing selections areas are placed near a machine readable image to for retrieving an information item about a product to which the machine readable image is associated. These selection areas can be visually represented by icons/text/images that inform the user what information will be retrieved or what action will be controlled if selected.

A capturing device captures a machine readable image together with icons/text/images representing selections areas, displays these on the screen for the user to select one of the icons/text/images. The capturing device calculates the coordinates of the selection relative to the machine readable image using a unit of distance and perspective correction derived from the machine readable image. These coordinates are provided to an information server associated with the machine readable image which in turn provides the information associated to the coordinates to the capturing device.

BRIEF DESCRIPTION OF THE DRAWINGS

FIG. 4*a* shows a standard barcode where the capture orientation is indicated by icons having two different orientations.
FIG. 4*b* shows a QR code where the capture orientation is indicated by icons having two different orientations.
FIG. 5 shows a QR code where four capture orientation are indicated by icons having 4 different orientations.
FIG. 6 shows a QR code where eight capture orientation are indicated by icons having 8 different orientations.

MODES FOR CARRYING OUT THE INVENTION

In the subsequent FIGS. 1 to 11 the rotation angle is obtained by rotating the capturing device in order to point to the selected icon, effectively rotating the QR code on the screen of the capturing device after which the angle between the selected icon and the QR code is determined based on the rotation angle of the QR code.

While the examples for ease of illustration show the machine readable image as a QR code it has to be noted that other images that can be captured and decoded or matched to images stored in a (remote) database such as a social web site profile image can be equally used instead of the QR code.

While the description uses a QR code with a URL in the description of the figures, it should be noted that other information stored in the machine readable image or derivable from this machine readable image, that points to stored information, can be used instead. For instance after establishing a match between a captured profile image of a social web site and the associated social network page by using an image search engine, the resulting link, derived from the image search, can be used as a basis for retrieving particular information as indicated by the rotation angle selected by the user.

Figure 1A:
FIG. 1*a* shows standard barcode captured in 1 dimension.

FIG. 1a shows standard barcode captured in 1 dimension.

A barcode is an optical machine-readable representation of data relating to the object to which it is attached. Originally barcodes represented data by varying the widths and spacing of parallel lines. This is the type of barcode 1 shown in FIG. 1. These barcodes are referred to as linear or one-dimensional (1D) barcodes. As the last digit of a barcode is a checksum digit the capturing device is aware of what is the end of the barcode. The capturing device simply decodes the captured sequence of bits, checks whether the calculated checksum digit matches the checksum digit read at the end of the capture, and decide that the 1D barcode 1 was captured correctly, i.e. with the checksum on the right hand side.

Figure 1B:
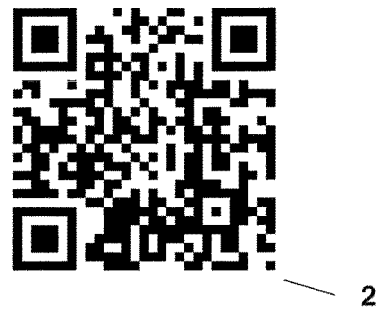
FIG. 1*b* shows a QR code captured in 2 dimensions.

If this fails to yield a checksum digit that matches the decoded checksum digit from the end of the scan, the pattern is digitally reversed (i.e. sequence of decoded bits is reversed) and the decode process is repeated. This results in a calculated checksum digit that matches the checksum digit read from the barcode 1, and the capturing device effectively corrected for the fact that the barcode 1 was captured upside down. This process produces a single result which is used to retrieve the data related to the object to which the barcode 1 is attached. FIG. 1b shows a QR code captured in 2 dimensions.

Even though the description refers mostly to the QR code, other 2 dimensional barcodes exist such as the Data Matrix 2D, the Aztec code, the EZ code, the High Capacity Color Barcode, the Maxi code, the Shot code and the Twibright Optar code.

In order to decode such 2 dimensional barcode the correct orientation must be established before decoding. For this all 2 dimensional barcodes have position patterns 2a and alignment patterns 2b.

U.S. Pat. No. 5,726,435 discloses a 2 dimensional machine readable code, a so called 2D barcode.

To properly decode the information stored in the 2D Barcode U.S. Pat. No. 5,726,435 discloses in FIG. 3 and the associated description an apex detection to determine the actual rotation angle (tilt) of the 2D barcode.

The decode preprocessing includes rotation angle detection and coordinate conversion processing, both of which are mandatory when each two-dimensional code is randomly placed with an uncertain rotation angle with respect to a reading device. Also scaling is required due to the unknown size of the QR code in the image captured. The position marks 2a aid in this scaling. It should however be noted that the prior art discards the rotation angle detected after correcting during preprocessing for the rotation angle in order to position the QR code upright before the actual decoding.

Figure 2A:
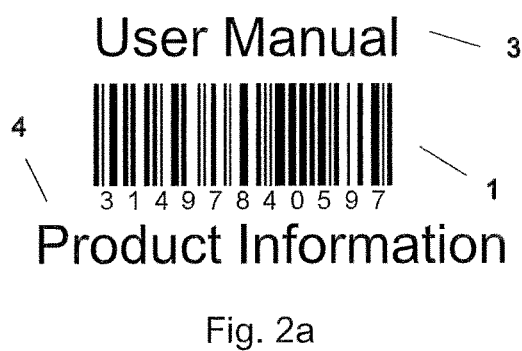
FIG. 2*a* shows a standard barcode with information associated with capture orientations.

FIG. 2a shows a standard barcode with information associated with capture orientations. In the present invention the rotation angle/tilt angle is used to retrieve different information depending on the orientation of the barcode 1 during the capture. To assist the user in selecting the correct capture orientation text/icons 3, 4 are placed near the barcode 1.

In the example of FIG. 2a text 3, 4 is used. When captured in the normal upright position the product information 4 is selected as a result of the rotation angle selected during capturing.

However, when the barcode 1 is captured upside down (a rotation angle of 180 degrees) the user manual information 3 is selected.

Figure 2B:
FIG. 2*b* shows a QR code with information associated with capture orientations.

FIG. 2b shows a QR code with information associated with capture orientations.

As the upright capture position of the QR code 2 (or other 2 dimensional barcodes) is known, the rotation angle of the QR code 2 during capturing can be used to determine what information item 5, 6 has been selected by the user. To assist the user in selecting the correct capture orientation text/icons 5, 6 are placed near the QR code 2. In the example of FIG. 2b text 5, 6 is used. When captured in the normal upright position the product information 5 is selected as a result of the rotation angle selected during scanning.

However, when the QR code 2 is captured upside down the user manual information 6 is selected.

Figure 3A:
FIG. 3*a* shows a standard barcode where the capture orientation is indicated by text having different orientations.
Figure 3B:
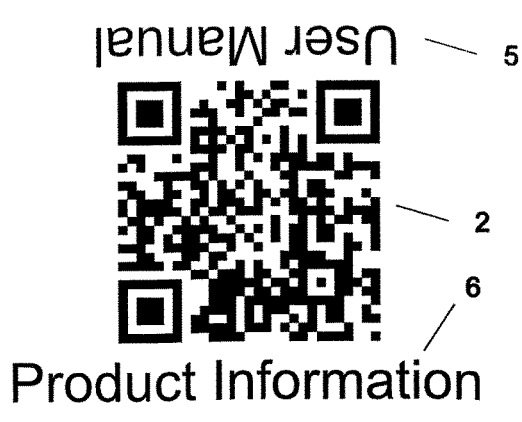
FIG. 3*b* shows a QR code where the capture orientation is indicated by text having different orientations.

FIG. 3a shows a standard barcode where the capture orientation is indicated by text having different orientations. To make it more intuitive for the user to select the correct capture orientation for each information item 3, 4, the orientation of the text/icon matches the desired capture rotation angle. Capturing the barcode 1 when the text/icon 3,4 of the desired information item is in the upright position, the capture orientation results in a rotation angle/tilt angle of the barcode in the capture. This rotation angle is then determined by the capturing device and used to retrieve the information item that matches the text/icon 3, 4 that was in the upright position during the capture. It should be explicitly noted that the text/icon 3, 4 itself is not captured but are present to help the user create the correct rotation angle of the bar code 1 during scanning It is self evident that when the upright position of the text or icon indicates the information item associated with that capture direction, the location relative to the machine readable code can be varied. For ease of explanation the figures show a consistent positioning of the icons and text but the icon above the machine readable image can be placed below the machine readable image as long as the orientation relative to the machine readable image is not changed FIG. 3b shows a QR code where the capture orientation is indicated by text having different orientations. Also with 2 dimensional code 2 it can be made more intuitive for the user to select the correct capture orientation for each information item 5, 6, by adapting the orientation of the text/icon 5, 6 to match the desired capture orientation. Capturing the QR code 2 when the text/icon 5,6 of the desired information item is in the upright position, the capture orientation results in a rotation angle/tilt angle of the barcode in the capture. This rotation angle is then determined by the capturing device and used to retrieve the information item that matches the text/icon 5,6 that was in the upright position during the capture. It should be explicitly noted that the text/icon 5,6 itself are not captured but are present to help the user create the correct rotation angle of the QR code 2 during scanning. It should also be noted that text has an inherent upright orientation easily recognized by the user thus automatically inviting him to turn the barcode to read the text, deciding whether he is interested in the information item and then capturing the barcode 1 in its present orientation which is correct for the information item associated with the text he turned into the normal upright reading position.

FIG. 4a shows a standard barcode where the capture orientation is indicated by icons having two different orientations. In this embodiment of the machine readable image the text shown in FIG. 2 has been replaced by icons. The icons are also positioned so as to be in the normal upright position when capturing the barcode 1. Capturing the barcode in the position where the information icon 8 is in the upright position will result in a rotation angle of the barcode 1 of +–0 degrees. Capturing the barcode 1 in the position where the social network icon 9 is in the upright position will result in a rotation angle of the barcode 1 of +–180 degrees. When passing this rotation angle on to the provider of the information item the provider can return information that is associated with the icon to the capturing device. For instance, when the angle of +–0 degrees is passed on to the provider the provider will return the data associated with the information icon 8. When the angle of +–180 degrees is passed on to the provider the provider will return data from the social network.

It is clear that the rotation angle need not be provided in degrees. In the present example a single bit or digit can be added: 0 represents a +–0 degrees angle, while 1 represents a +–180 degrees angle.

It should further be noted that instead of simply adding the angle to the data used to retrieve information, specific angles can be reserved for specific uses. The icon for the social network can for instance always be positioned such that the barcode 1 is captured upside down. The capturing device in that case can access the social network directly without first passing the rotation angle on to another web site. For example, when capturing the barcode 1 upright, i.e. desiring to retrieve the general information from the manufacturer an angle of +–0 degrees determined causes the capturing device to contact the standard database to retrieve the product information, while capturing the barcode 1 upside down, i.e. desiring the to retrieve information from the social network an angle of +–180 degrees determined causes the capturing device to directly contact the social network while providing the information retrieved from the barcode and thus get feedback information about the product from friends on the social network.

FIG. 4b shows a QR code where the capture orientation is indicated by icons having two different orientations. In this embodiment of the machine readable image the text shown in FIG. 3 has been replaced by icons. The icons are also positioned so as to be in the normal upright position when capturing the QR code 2. Capturing the QR code 2 in the position where the information icon 8 is in the upright position will result in a rotation angle of the QR code 2 of +–0 degrees.

Capturing the QR code 2 in the position where the social network icon 9 is in the upright position will result in a rotation angle of the QR code 2 of +–180 degrees.

When passing this rotation angle on to the provider of the information item the provider can return information that is associated with the icon to the capturing device. For instance, when the angle of +–0 degrees is passed on to the provider the provider will return the data associated with the information icon 8. When the angle of +–180 degrees is passed on to the provider the provider will return data from the social network.

It is clear that the rotation angle need not be provided in degrees. In the present example a single bit or digit can be added: 0 represents a +–0 degrees angle, while 1 represents a +–180 It degrees angle.

It should further be noted that instead of simply adding the angle to the data used to retrieve information specific angles can be reserved for specific uses. The icon for the social network can always be positioned for example such that the QR code 2 is captured upside down. The capturing device in that case can access the social network directly without passing the rotation angle on to a web site. Elements of the data stored in the QR code can then serve to retrieve specific information from the social network.

FIG. 5 shows a QR code where four capture orientation are indicated by icons having 4 different orientations. The 2 dimensional bar codes can be captured from various angles. Angles of 90 degrees can easily be determined. Thus capturing the QR code in 4 positions allows large margins when determining the rotation angle/tilt angle. The user is thus allowed to deviate up to a margin from the ideal 0, 90, 180 and 270 degree capture orientations. When capturing the capturing device can determine the rotation angle and give feedback (sound or color feedback) to the user whether the angle is within limits, further reducing a source of possible errors. This further contributes to the intuitive use of the present invention.

FIG. 6 shows a QR code where eight capture orientation are indicated by icons having 8 different orientations. The number of capture orientations, and thus allowed rotation angles can be increased to 8, i.e. 0, 45, 90, 135, 180, 225, 270, 315 degrees. As these angles are 45 degrees apart there are still ample margins to reliably distinguish between the various captured rotation angles while allowing the user to be slightly off in choosing his capture orientation.

Also here, the capturing device can determine the angle and give feedback (sound or color feedback) to the user whether the angle is within limits, further reducing a source of possible errors. This further contributes to the intuitive use of the present invention.

Figure 7A:
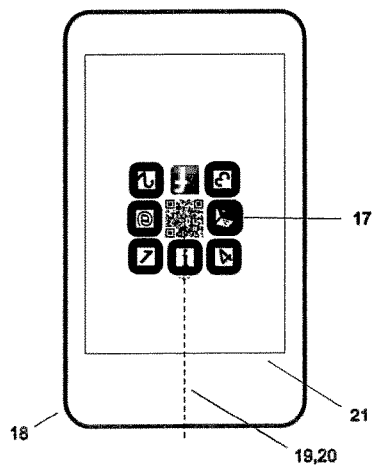
FIG. 7*a,b,c* shows a device according to the invention capturing a machine readable image.
Figure 7B:
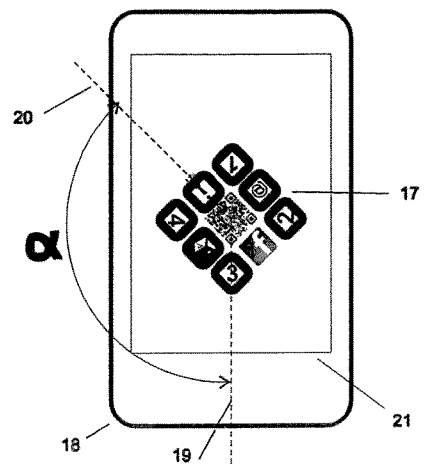
Figure 8:
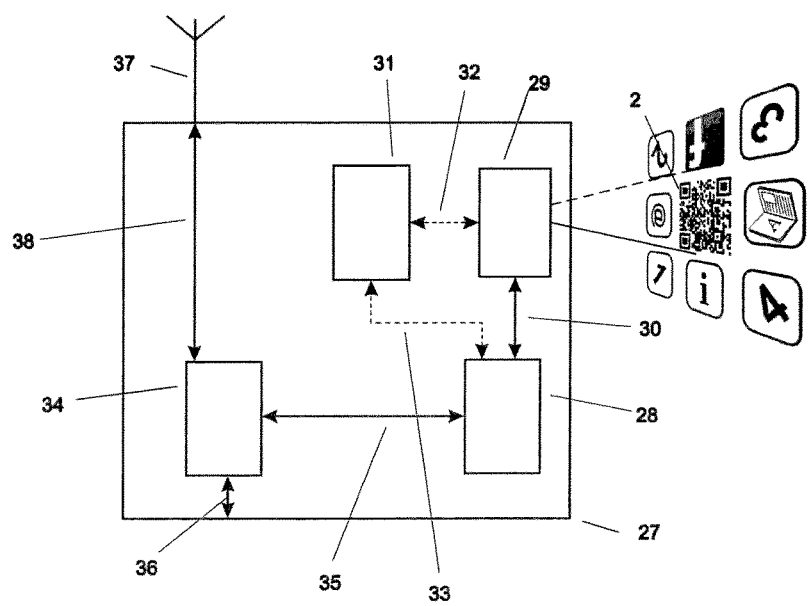
FIG. 8 shows a device according to an exemplary embodiment of the present invention, the device including a central processing unit, a capturing device capable of capturing a capture of a machine readable image, here shown as a QR code, and an interface.
Figure 9:
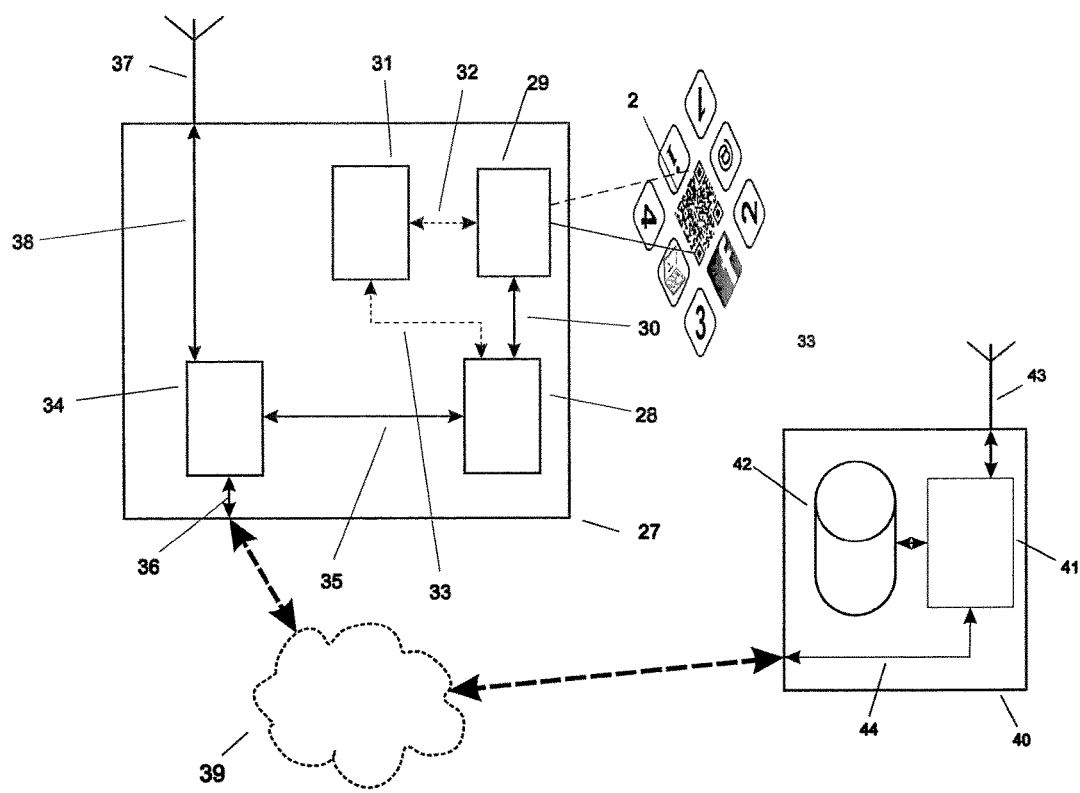
FIG. 9 shows a device using a rotation angle detector to obtain different information items.

In FIG. 7a and FIG. 8 the capturing device is depicted capturing the machine readable image 2 in the orientation where the information icon "i" is upright while in FIG. 7b and FIG. 9 the capturing device is depicted capturing the machine readable image 2 in the orientation where the icon "3" is upright.

FIGS. 7a and 7b show a device according to the invention capturing a machine readable image. The device 18 shown in FIGS. 7a and 7b is a handheld device such as a mobile phone, a camera, or an organizer.

In FIG. 7a the device 18 is shown capturing the machine readable image of FIG. 6. The machine readable image 17 is captured in its upright position. The dotted line 20 denotes the upright position of the machine readable image 17 and is determined before decoding the machine readable image 17. The dotted line 19 denotes the 0 degree reference of the device 18 while capturing the machine readable image 17.

This reference can be established either by a position sensor of the device (to be discussed in FIG. 8) or can be defined by the user. In the case of FIGS. 7a and 7b the bottom of the screen 21 is considered the bottom of the captured image comprising the captured machine readable image 17, resulting in the 0 degrees reference shown.

The other sides of the image can be defined to be the bottom of the captured image, changing the 0 degrees reference to be perpendicular to that side.

The angle α formed by the dotted lines 19,20 represents the rotation angle α of the device 18 relative to the upright position of the machine readable image 17. In FIG. 7a the rotation angle α is 0 degrees. In this case the information item associated with the "i" symbol is to be retrieved.

In FIG. 7b the device 18 has been rotated by the user over an angle of 135 degrees relative to the machine readable image 17. The device 18 is, for illustration purposes kept in the same orientation as in FIG. 7a. Consequently the machine readable image 17 appears rotated relative to the device 18.

The machine readable image 17 is thus captured at a rotation angle α of 135 degrees relative to its upright position. The dotted line 20 denotes the upright position of the machine readable image 17 while the dotted line 19 denotes the 0 degree reference of the device 18. The angle α formed by the dotted lines 19,20 represents the rotation angle α of the device 18 relative to the upright position of the machine readable image 17. In FIG. 7b the rotation angle α is 135 degrees. In this case the information item associated with the "3" symbol is to be retrieved.

It is self evident that the device 18 can use another 0 degree reference to determine the rotation angle α such as one of the sides of its screen. Especially when the machine readable code is captured using a camera in the device 18, one of the 4 sides of the display can be assigned as the bottom of the picture taken. This side can advantageously be chosen to be a reference of the device 18 and the rotation angle α of the machine readable image 17 can be determined relative to this reference. When the bottom is selected, a correction for the 90 degrees angle between the bottom of the display and the 0 degrees reference must be performed.

Alternatively, when not the bottom or top of the picture is selected but one of the sides of the captured picture, the sides are parallel to the 0 degrees reference 19 shown, and no correction is needed.

Figure 7C:
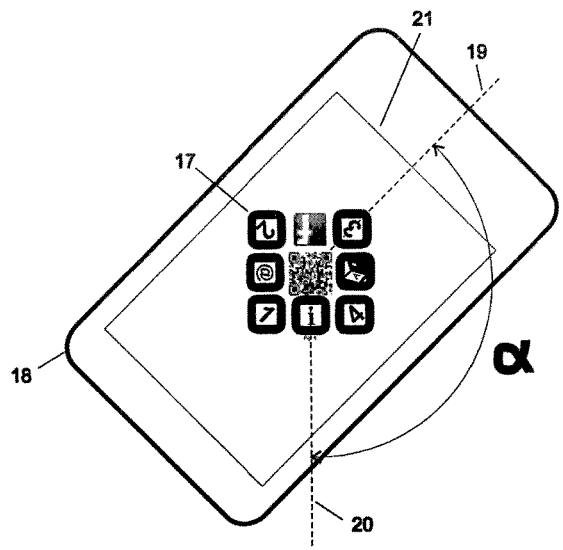

In FIG. 7c illustrates how the same rotation of the device 18 over an angle of 135 degrees appears from a perspective of the user. The machine readable image 17 is for illustration purposes kept in the same orientation as in FIG. 7a.

It should be noted that it is also possible for the user to rotate the captured image on-screen into the desired position instead of rotating the machine readable image 17 or the device 18. Lines 19, 20 as shown in FIGS. 7a and 7b can be displayed while performing this rotation to assist the user. Alternatively the user can be assisted by highlighting the icon currently selected given the current rotation angle α. This highlighting can be achieved for instance by highlighting the icon itself or displaying a wedge shaped overlay originating from the center of the machine readable image 17 thus indicating a zone in which the desired icon should be when capturing the machine readable image 17.

It should further be noted that it is also possible for the user to indicate the desired icon by just touching the icon on-screen before or after capture instead of rotating the machine readable image 17 or the device 18. The device does not need to be aware of the presence of icons, it just needs to determine the rotation angle α and can also do such on screen by determining the upright orientation of the machine readable image 17, determining a line between the center of the machine readable image 17 and the area touched by the user and calculate the rotation angle thus obtained. The rotation angle is subsequently matched to one of the available zones and the angle associated to that zone is used when retrieving the information item.

Alternatively the device 18 can recognize the machine readable image 17, establish fixed zones around the machine readable image and wait for the user to touch one of the zones. Each zone is associated with an angle and the angle associated with the zone touched is used for retrieving the information item.

FIG. 8 shows a device according to the invention.

The device 27 comprises a central processing unit 28 which is couples to a capturing device 29 via an interface 30. The capturing device 29 is capable of capturing a capture of the machine readable image 2, here shown as a QR code. The device further comprises an position sensor 31. This position sensor 29 can be part of the camera, indicated by the dotted arrow 32, or can be coupled to the central processing unit 28, indicated by the dotted arrow 33.

The device 27 further comprises a communication interface 34 which is coupled to the central processing unit 28 via an interface 35 and regulates communications between the device 27 and the outside world. For this the communication interface 34 has several interfaces 36, 37. The external connections include a wired connection 36 and a wireless connection 37 for connection to the internet or directly to a database.

When the user desires to retrieve an information item he starts an application on the central processing unit 28 that in turn instructs the camera 29 to start recording a picture. The user positions the camera such that the icon representing the desired information item is upright in the picture, resulting in a particular rotation angle of the machine readable image 2 during the recording of the picture. If the camera is equipped with a position sensor 31 the camera can provide the position information of the camera, for instance in the form of specifying what side of the picture is the bottom of the picture. If the camera has no such sensor 31 a predefined side of the picture is assumed to be the bottom. Alternatively the device itself may have a position sensor 31 that is able to tell what side of the picture represents the bottom (i.e. picture is taken in landscape, portrait or at an intermediate position). This information, together with the picture received from the camera allows the device to determine the rotation angle of the machine readable image and thus of the rotation angle. This angle information can be checked against predefined zones, for instance when an angle is detected of 35 degrees it is accepted because the closest angle 45 degrees is only 10 degrees away and the distance to the next closest angle (0 degrees) is sufficiently large (35 degrees) to safely say that the user desires the information item associated to the 45 degree rotation angle.

After determining the rotation angle of the machine readable image 2 the device 27 retrieves the content of the machine readable image 2 (if any) and modifies the content based on the determined rotation angle and initiates the retrieval of the information item.

When the device 27 detects a rotation angle it passes the rotation angle on to data provider 40 by modifying the URL for example by adding a number representing the detected rotation angle.

This results in modified URLs. For example when 8 rotation angles are distinguished:

"www.company.com/our_first_product/0" (corresponding to −22.5 to +22.5 degrees).
"www.company.com/our_first_product/1" (corresponding to +22.5 to +67.5 degrees).
"www.company.com/our_first_product/2" (corresponding to +67.5 to +112.5 degrees).
"www.company.com/our_first_product/3" (corresponding to +122.5 to +157.5 degrees).
"www.company.com/our_first_product/4" (corresponding to +157.5 to +202.5 degrees).
"www.company.com/our_first_product/5" (corresponding to +202.5 to +247.5 degrees).
"www.company.com/our_first_product/6" (corresponding to +247.5 to +292.5 degrees).
"www.company.com/our_first_product/7" (corresponding to +292.5 to +337.5 degrees).

The last digit of the URL represents a detected rotation angle and thus the information item associated with that rotation angle. Other methods of indicating the rotation angle are equivalent such as using just 3 bits to encode the 8 positions or passing on that angle that best matches the detected rotation angle, for instance modifying the URL to "www.company.com/our_first_product/135" when the detected rotation angle is between +122.5 and +157.5 degrees as 135 degrees is the angle that best matches the detected rotation angle.

In addition, the device can include the actual determined rotation angle in the URL, for instance "www.company.com/our_first_product/127" and the server receiving this rotation angle determines which information item best matches the received roational angle. The above example URLs, using numbers are just for explanation. When implementing the invention the full scale of possibilities provided by language to request the information from the information server can be used, as long as the device is aware of this.

For instance, when capturing the machine readable image the information derived from the machine readable image can be used to contact the information server which in turn provides the device with instructions on how to request the various information items. The device subsequently requests the desired information item based on the rotation angle α as explained.

FIG. 9 shows a device using a rotation angle detector to obtain different information items. The device is now shown connected to a data provider such as a web server. The configuration shows the device connected via a wired connection through a network 39 but a wireless connection or a direct connection are of course also possible.

In case the network 39 is the internet a typical way of retrieving data from a data provider 40 is through a URL link. A standard device would retrieve the URL stored in the QR code 2 and request the web page at this URL from the data provider 40. The processor unit 41 of the data provider 40 will receive the request for the web page and retrieve the page from the storage unit 42. An example of a basic URL stored in the QR code is "www.company.com/our_first_product".

When the device 27 detects a rotation angle it passes the rotation angle on to data provider 40 by modifying the URL for example by adding a number representing the detected rotation angle.

This results in modified URLs. For example when 8 capture rotation angles are distinguished:
"www.company.com/our_first_product/0".
"www.company.com/our_first_product/1".
"www.company.com/our_first_product/2".
"www.company.com/our_first_product/3".
"www.company.com/our_first_product/4".
"www.company.com/our_first_product/5".
"www.company.com/our_first_product/6".
"www.company.com/our_first_product/7".

The last digit represents a detected rotation angle and thus the information item associated with that rotation angle.

The data provider has 8 web pages for this product instead of just one and provides a different web page for each of the modified URLs shown above.

Referring to the example QR code shown in FIG. 6 the provider 40 returns in response to URL "www.company.com/our_first_product/0" the general information page associated with the product.

In response to the URL "www.company.com/our_first_product/2" the provider 40 returns the email address or a webmail to send messages associated with the product.

In response to the URL "www.company.com/our_first_product/4" the provider returns the social network page associated with the product.

In response to the URL "www.company.com/our_first_product/6" the provider 40 returns the web page with the user manual associated with the product.

In response to the basic URL send by devices not using the present invention the provider returns the general web page to ensure compatibility with the large installed base of devices.

Figure 10:
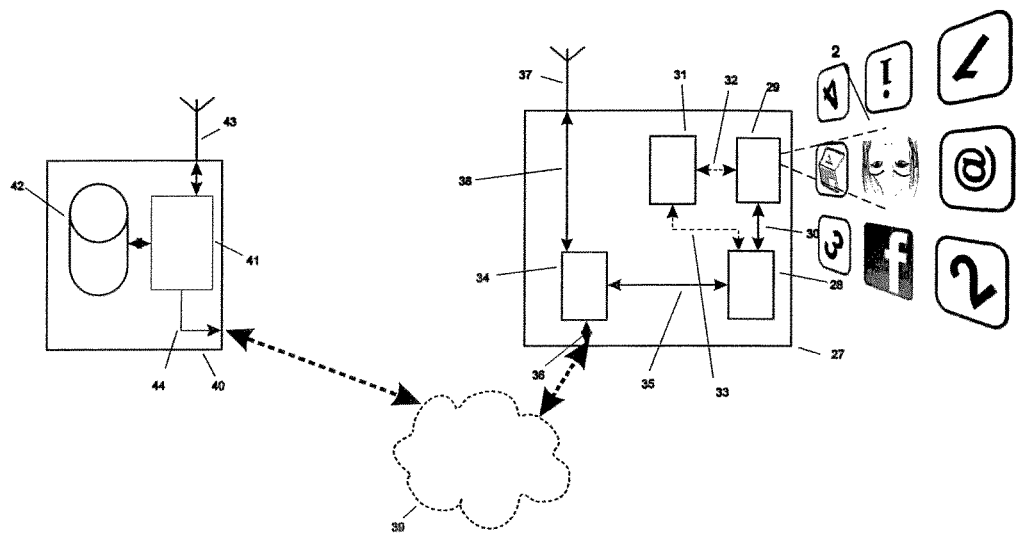
FIG. 10 shows a device retrieving information from a social network.

FIG. 10 shows a device retrieving information from a social network.

Here the device 27 determines the rotation angle of the machine readable image. In this case the machine readable image is a profile picture of a person on a social network. Shown is a line graphic but actual pictures can be used equally well. The device will initiate an application that establishes a match of this image to the source of this image on the web or on a social network. In the orientation shown, the social network icon is an upright position (in the example resulting in a rotation angle of the captured image of 180 degrees). When this position is universally reserved for social network information items the device can go straight to the social network site where the image was found and retrieve information even if the image has other occurrences on non social network sites.

The social network site may act as a redirecting site, i.e. the social network site acts as the provider of as discussed in FIG. 8 where the user can define, in his profile what icons he is going to use with his social network profile. Subsequently when his profile image is used elsewhere on the internet people can use the icons defined by the social network user.

A first user may want to allow people to find out about his hobbies and sports while another may want to provide professional back ground or literature preferences. The first user can include an icon representing hobbies and sports, while the second user can include icons representing professional information and literature. The icons merely aid in selecting, as the URL created during the selection merley includes the rotation angle. At the information server side the translation to the requested information is made.

In addition social network users can restrict access to the information to people with whom they disclose the access key in the form of subsequent scans of predefined rotation angles of the image.

Figure 11:
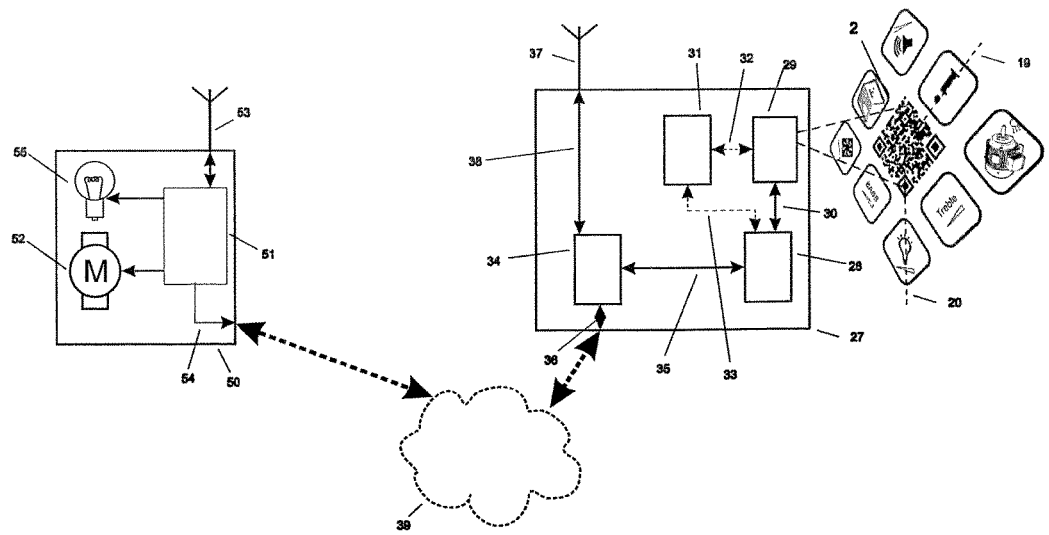
FIG. 11 shows a device using a rotation angle detector to control a further device or machine.

FIG. 11 shows a device using a rotation angle detector to control a further device or machine. The device 27 of FIG. 8 is now used for controlling a further device 50. The further device 50 can be anything that needs adjustment of controls such as a radio or a domotics system for controlling several devices in the home or a machine or toy. Figure will be explained using the example of a domotics system. The machine readable image 2 comprises a QR code surrounded by several icons. The machine readable image 2 has for illustration purposes been provided with a 0 degrees reference line 19 and a second line 20 indicating the rotation angle α. The icons surrounding the machine readable image 2 correspond to the control elements 52, 55 of the domotics system 50. When the user desires to change one of the control elements of the domotics system 50 he positions and rotates his device 27 so that when the machine readable image is captured, the icon that corresponds to his selection is correctly oriented on his screen as explained before. By touching the screen the capture is effectuated and thus the desired control selected but instead of releasing the user continues to touch the screen while starting to turn the device 27. As the device 27 keeps track of the orientation of the machine readable image 2 it keeps track of changes in the rotation angle α. The device 27 uses this change in rotation angle α to affect increases or decreases in the control function selected. In FIG. 11 the selected control regulates the brightness of a lamp as for the device the lamp adjustment icon is in its upright position as indicated by the dotted line 20. When the control is selected the further rotation of the device and the resulting change in rotation angle α will result in an increase respectively decrease of the lamps brightness, depending on the direction of the rotation.

For this, the domotics system 50 comprises a controller 51 that is connected to the network 39 via interface 54 which allows the device 27 to communicate with the domotics system 50. As indicated by antenna 37 of the device 27 and by the antenna 53 of the domotics system 50 the communication can also be implemented on a peer to peer basis.

When the device 27 captures the machine readable image 2 and has determined the rotation angle of this capture it will contact the domotics system 50, using the information stored in the QR code and the rotation angle α detected. An example is a URL "www.mydomoticssystem.com/3" as the rotation angle at selection was 135 degrees. The domotics system can be contacted at "www.mydomoticssystem.com". The "3" tells the domotics system 50 that the lamp brightness control has been selected by the user. The domotics system 50 subsequently responds for instance by providing a web page to the device 27 having an entry field in which the device 27 can continuously update the rotation angle changes as detected by the device 27 after the initial selection of the control by the user.

The domotics system 50 uses these updates to adjust the brightness of the lamp accordingly. When including the actual rotation angle in the URL the server can perform the translation from rotation angle to function by selecting the function that best matches the received rotation angle, for instance by defining ranges of rotation angles for each function.

This also allows the change of functions centrally on the server without having to interfere with the capturing device.

Alternatively the device 27 can send a URL to the domotics system 50 every time a change in the rotation angle α is detected. For example www.mydomoticssystem.com/3/up is sent when a positive change of the rotation angle α is detected and www.mydomoticssystem.com/3/down is sent when a negative change of the rotation angle α is detected. As stated above any agreed upon syntax can be used, i.e. "up" and "down" are just examples.

When "www.mydomoticssystem.com/3/up" is received by the domotics device 50 it increases the lamp brightness while when "www.mydomoticssystem.com/3/down" is received the brightness is reduced.

In a similar fashion the electric motor 52 can be controlled by first capturing the machine readable image 2 in the orientation corresponding to the electric motor icon and subsequently continuing to touch the screen while rotating the device 27 to increase or decrease the rotation angle α. Other functions indicated by the icons in FIG. 11 are volume control, bass control, treble control, fan control, user manual retrieval and general information.

It should be noted that, as the QR code provides position patterns changes in the magnification of the QR code can also be detected and used. As such a combination of rotation for selection of the control and subsequently detecting changes in the size of the QR code (i.e. magnification either by changing the distance between the device 27 and the QR code or by electronically changing the magnification on screen) for adjusting the control can also be implemented.

It should further be noted that the device can be arranged for the user to indicate the desired icon by just touching the icon on-screen before or after capture instead of rotating the machine readable image or the device. Even while displaying the icons, the device does not need to use the exact locations of displayed icons, it just needs to determine the rotation angle α and can also do such on screen by determining the upright orientation of the machine readable image, determining a line between the center of the machine readable image and the area touched by the user and calculate the rotation angle thus obtained. The rotation angle is subsequently matched to one of the available zones either by the capturing device or by the server and the angle associated to that zone is used when retrieving the information item. Alternatively the device can recognize the machine readable image, establish fixed zones around the machine readable image and wait for the user to touch one of the zones. Each zone is associated with an angle and the angle associated with the zone touched is used for creating the URL and thus retrieving the information item.

In the subsequent FIGS. 12 to 16 the rotation angle is no longer obtained by rotating the capturing device in order to point to the selected icon but the device can be held in any orientation and the selection is made by the user by selecting the icon on the screen of the capturing device after which the angle between the selected icon and the QR code is determined. It should further be noted that the icons that can be selected are part of the captured image and the capturing device need not be aware of the icons' presence.

It should further be noted that the capturing device, when implementing the embodiments described in FIGS. 12-17, does not need a position sensor nor a predefined edge of the screen as a zero degree reference as the reference is derived from the QR code itself and the rotation angle is derived from this derived reference and the touched screen area.

Figure 12:
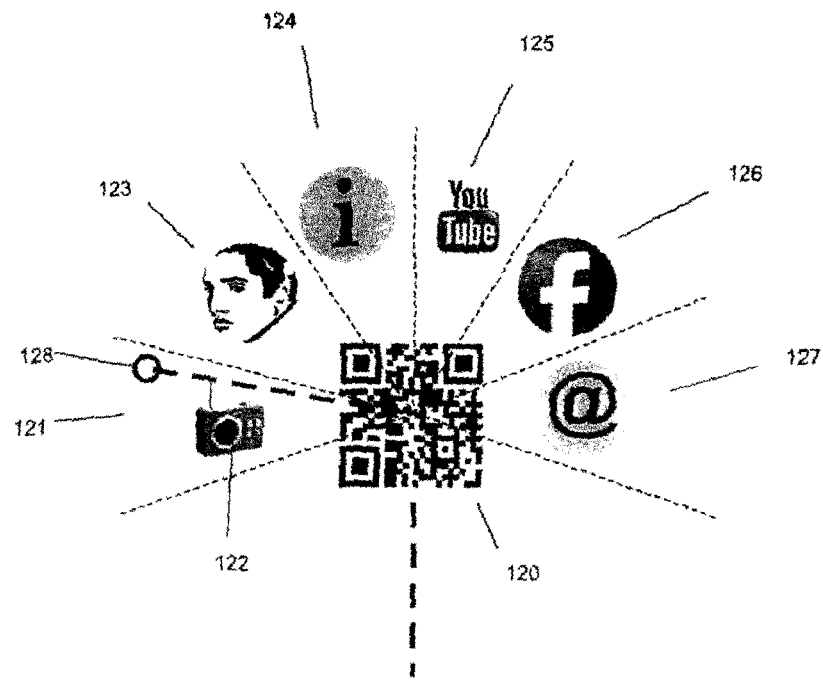
FIG. 12 shows a arrangement of the icons around the QR code such that the required range of movement of the user's wrist is limited

FIG. 12 shows a arrangement of the icons around the QR code such that the required range of movement of the user's wrist is limited.

Instead of using the full 360 degrees around the QR code 120, icons 122,123,124,125,126,127 are now positioned so that the user doesn't need to rotate the capturing device all the way, depending of course on the icon 122,123,124,125, 126,127 he desires to select. In the given example, the range over which the capturing device may need to be moved is limited to 90 degrees to the right en 90 degrees to the left.

When positioning the icons 122,123,124,125,126,127 around the QR code 120 using the full 360 degrees, the user is most likely required to re-grasp the scanning device in order to select the bottom icon, or he needs to rotate the QR code 120 with surrounding icons 122,123,124,125,126,127 over 180 degrees in order to capture the QR code comfortably. Limiting the range of the rotation angle ensures the user does not need to re-grasp the capturing device and does not need to rotate the QR code 120 for comfortable scanning.

In the example of FIG. 12 the dotted lines denote the boundaries of the zones. For instance the radio icon 122, representing a radio station, is validly selected by holding the capturing device so that the arrow in the display of the capturing device points from the QR code 120 to an area within the radio station zone 121 delimited by the dotted lines.

By pointing the capturing device in such a way, the QR code 120 will be rotated relative to the normal orientation indicated in the display of the capturing device (indicated by the dotted line ending at the circle 128). The capturing device can then determine the angle between the QR code 120 (0 degrees being indicated by the long dotted line) and the dotted angle ending at the circle.

As explained above the 0 degree reference can also be selected to be a line through the two top Position Detection Patterns of the QR code 120 and the angle expressed in relation to this choice of 0 degree reference. This angle is appended to the URL and in the case of the example of FIG. 12 would result in an angle of 260 degrees being included in the URL:

www.mywebsite.com?angle=260

As can be seen in FIG. 12, the zones can be arbitrary chosen by the issuer of the QR code 120 with icons 122,123,124,125,126,127.

As the issuer knows the position of the icons 122,123, 124,125,126,127, he also knows the angles associated to the zones, and the required response when a URL with an angle indication attached is received by the information server.

The issuer can give zones different sizes, as can be seen in FIG. 12 where the zone associated with the youtube icon 125 is smaller than the zone associated with the face 123. This can be used to give certain icons 122,123,124,125,126, 127 a different weight, as the icon 122,123,124,125,126,127 can be made larger, or separated more from the other icons. Also, the chance that the user correctly selects the larger zone is larger than for a smaller zone.

Such differentiation can be used for marketing purposes, or to ensure easy access to more important selections or to facilitate the access for the elderly or visually impaired persons.

Figure 13:
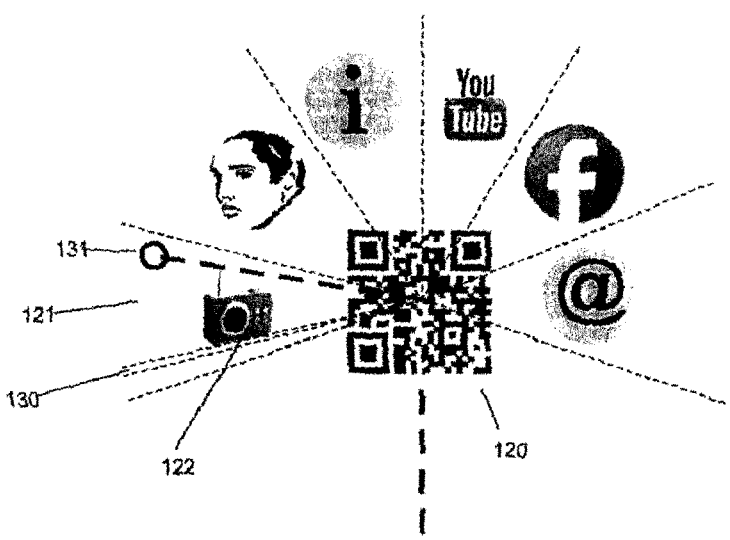
FIG. 13 shows a arrangement of the icons around the QR code such that the required range of movement of the user's wrist is limited and where a small secret zone is assigned a special function.

FIG. 13 shows a arrangement of the icons around the QR code such that the required range of movement of the user's wrist is limited and where a small secret zone is assigned a special function.

As the rotation angle can be determined with high accuracy the issuer can assign a small secret zone 130 to a special function. This is indicated in FIG. 13 by the small zone 130 inside the radio icon zone 121. A user, not being aware of this special zone 130, selecting the radio station by rotating his capturing device so that the arrow in the display of the capturing device points from the center of the QR code 120 to the radio icon 122 may accidentally hold his capturing device so that this small special zone 130 is selected. The issuer, when receiving a URL with an angle attached that corresponds to this small zone, can subsequently issue a rebate coupon or send other desirable information to the user's capturing device.

Depending on the issuers objective, the special zone 130 can be left at the same position, or can be moved randomly every time after a rebate coupon or price or special desirable information is send to the user's capturing device.

Also, as the issuer can change the location and size of the small special zone 130 at will, he can influence the chances of the special zone 130 being selected by a user. A larger special zone will result in a larger chance of a user capturing at an angle that is within the small zone. No change to the user's capturing device, nor the printed QR code with icons is needed, as this change is effected at the issuer's server.

In FIG. 13, the indicated capturing orientation (rotation angle as indicated by the dotted line from the center of the QR code 120 to the circle in the radio icon's zone 121) is inside the radio icon's zone 121, but not within the special zone 30, the user in this case thus not qualifying for the rebate coupon/price/special information.

As the special zone 130 can be changed at will, the issuer can vary the size and position of the special zone 130 for different times of day, can assign different responses (for instance: rebate coupons only during weekends, otherwise special information is provided) and can increase the size of the special zone 130 for returning customers or rather for first time customers. As most capturing devices also comprise GPS receivers the issuer can also make size, position and function of the special zone 130 dependent on geographic location of the user.

Figure 14:
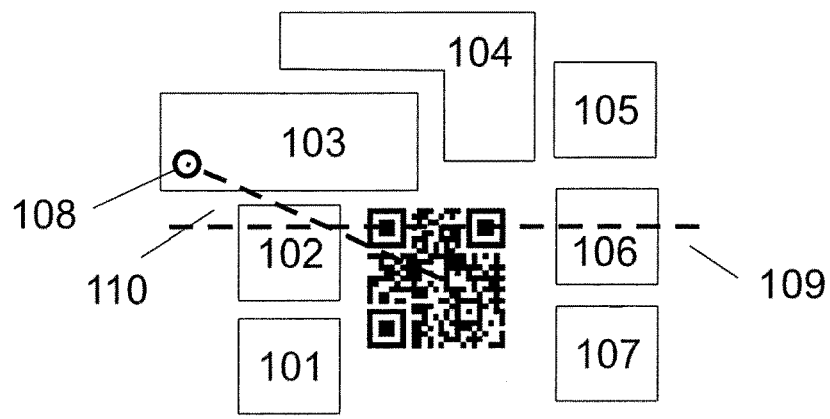
FIG. 14 shows an arrangement of icons adjacent to the QR code where distance information is required to properly identify a selection.
Figure 26:
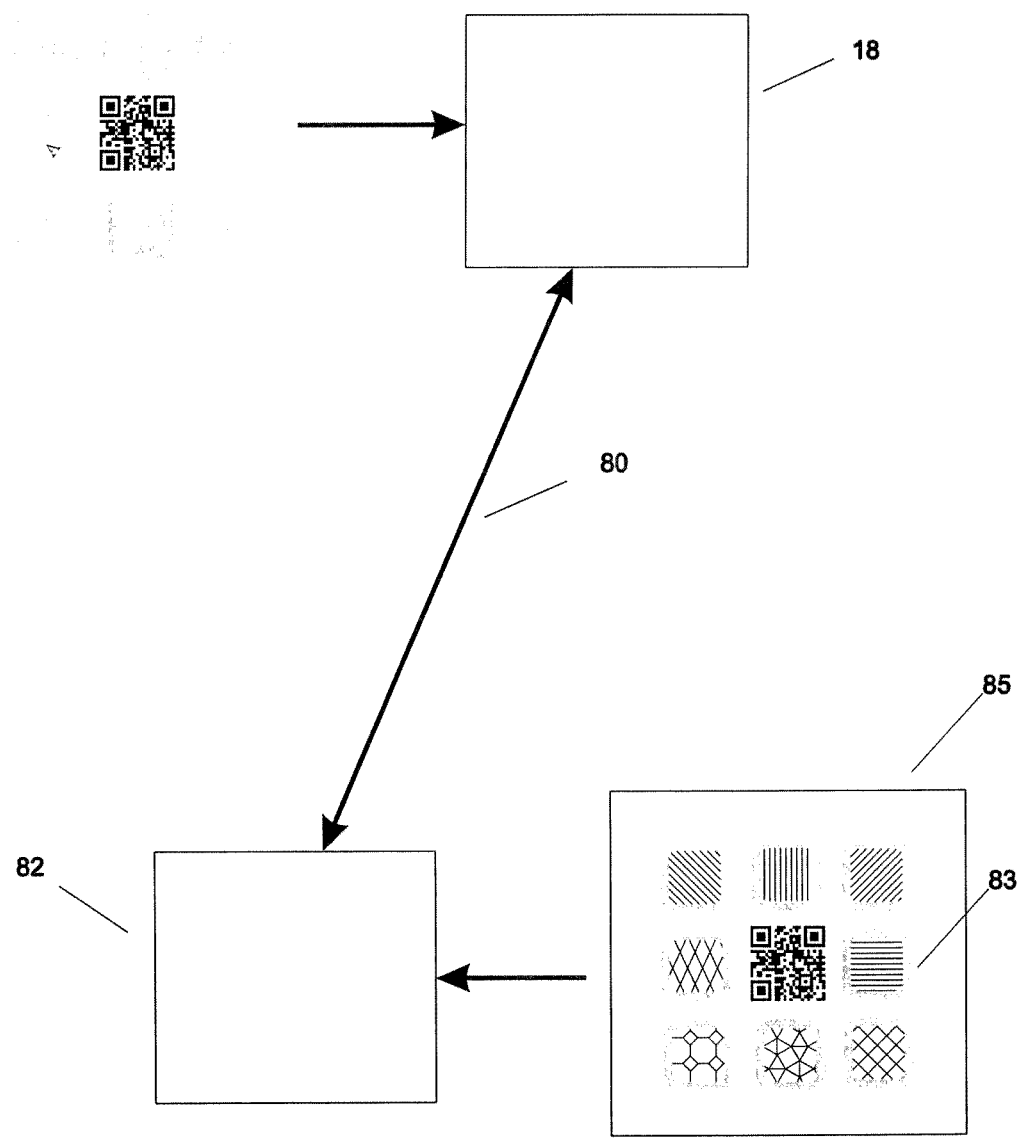
FIG. 26 shows an information server using an image to determine which information is desired based on the received coordinates.

FIG. 14 shows an arrangement of icons adjacent to the QR code where distance information is required to properly identify a selection. As the icons are irregularly shaped more than one icon may correspond to a particular rotation angle. The indicated selection of icon 103 results in a rotational angle 110 that is also valid for the icon 102 below. Hence to distinguish between both icons 102, 103 the distance from the QR code to the selection point 108 is determined and included in the URL to the server. Adding the distance allows multiple icons 101, 102, 103, 104, 105, 106 to be positioned at overlapping ranges of rotation angles 110. It should be noted that reference line 109 that denotes 0 degrees is, in FIG. 14, established based in the upper position detection patterns of the QR code. In most other figures the alternative is shown as there the two left position detection patterns are used for this purpose. Both alternatives are shown in FIG. 26 of ISO/IEC 18004:2000(E) First edition 2000-06-15.

Figure 15:
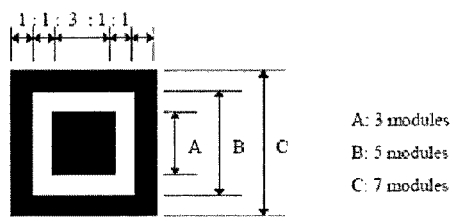
FIG. 15 shows a position detection pattern according to the QR standard

FIG. 15 shows a position detection pattern according to the QR standard.

The QR code is described in detail in ISO/IEC 18004: 2000(E) First edition 2000 Jun. 15.

In chapter 12 "Decoding procedure overview" a decoding procedure is outlined which is incorporated by reference into this description In chapter 13 "Reference decode algorithm for QR Code" a decoding algorithm is outlined which is also incorporated by reference into this description.

In steps 1 through 3 of chapter 13 it is explained how the angle of rotation (i.e. rotation angle) of the QR code is determined based on the detection of the Position Detection Patterns.

After having detected the position of the Position Detection Patterns, two Position Detection Patterns are selected and a line is drawn trough the center of the two selected Position Detection Patterns.

This line, for instance through the centers of the two top Position Detection Patterns (illustrated in FIG. 14), subsequently is used to determine the rotation angle between the QR code and the arrow on the screen of the capturing device, i.e. between the QR code and the selected icon. This angle corresponds to the rotation angle of the QR code as obtained when selecting the icon by rotating the capturing device as detailed in FIGS. 1 to 7. The rotation angle is passed on to the server of the issuer of the QR code with icons and used to determine which icon was selected by the user.

Alternatively the reference line can be drawn through the centers of the two left hand Position Detection Patterns. It is evident that when establishing a system for retrieving information using the invention one of the two alternatives must be consistently used.

Figure 16:
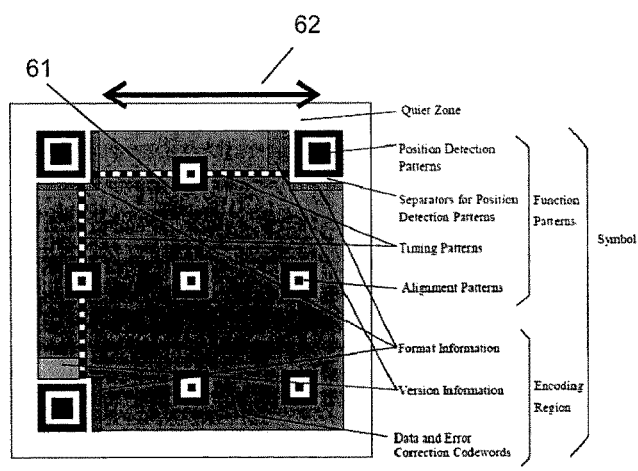
FIG. 16 shows the various elements of a QR code

FIG. 16 shows the various elements of a QR code

Besides of showing the Position Detection Patterns discussed in FIG. 15, FIG. 16 shows other relevant element of a QR code. As can be seen, the QR code can also comprise timing patterns 61. FIG. 16 is taken from the ISO/IEC 18004:2000(E) standard, FIG. 2 which is, together with section 7.3, 7.3.1 and 7.3.4 incorporated by reference.

These timing patterns 61 are either explicitly present or can be derived from the black and white pattern of the modules of the QR code.

Either the distance 62 between the Position Detection Patterns or the size of a module (smallest black/white element of the QR code) can be used as a unit of distance.

Either step 4 or step 5 of chapter 13 of ISO/IEC 18004:2000(E) can be used to establish a unit of distance.

When in step 4 the distance D is determined, this can be used as a unit of distance.

As this provides a relatively course unit of distance, other distances will be expressed as a real number with a prescribed number of decimals.

When in step 5 of chapter 13 of ISO/IEC 18004:2000(E) the nominal dimension of the modules of the symbol is determined, this can also be used as a unit of distance. In this case the unit of distance is the minimum length/width of a dark module respectively light module in the QR symbol. This provides a smaller unit of distance which allows other distances to be expressed as an integer multiple of the module size of the QR code.

When expressing other distances on the screen of the capturing device in this unit of distance, where a single unit is equal to the module size of the QR code, this other distance becomes independent of the on-screen size of the QR code as it scales together with the QR code itself. This will be explained in more detail in FIGS. 17 through 21.

Figure 17:
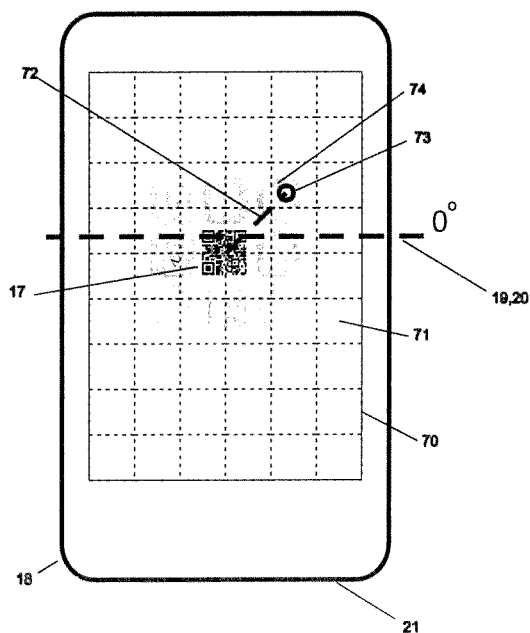
FIG. 17 shows a coordination lattice as derived from the orientation and dimension of a captured QR code.

FIG. 17 shows a coordination lattice as derived from the orientation and dimension of a captured QR code.

As the orientation of the QR code 17 on the screen of the capturing device 18 can be derived using the a position detection patterns of the QR code as explained in FIG. 15, and a unit of distance can be derived as explained in FIG. 16, the capturing device 18 can apply a coordinate system where the QR code is located at the origin. This coordinate system having X coordinates and Y coordinates is shown in FIG. 17 as a grid 70 where each grid cell 71 has the size of the QR code. As explained above the unit of distance can also be chosen to be equal to the module size of the distance D of FIG. 15.

The 0 degrees reference 19 is in FIG. 17 chosen to be a line through the two top position detection patterns. This results for the @-sign icon 75 shown in FIG. 17 to be at a 0 degrees position.

In the given constellation of icons, the @-sign icon 75 is validly selected if the rotation angle is between −22.5 degrees and 22.5 degrees.

Instead of rotating the capturing device 18 it is, for capturing devices comprising a touch screen, also possible to have the user indicate his selection by touching an icon on the touch screen. It is to be noted that everywhere in the present invention the icons are not generated by the capturing device but are merely displayed as part of the image of the QR code being captured. The capturing device is thus not aware of the presence of the icons on the screen. When the user touches the touch screen at the location 73 where an icon 75 is shown, a virtual line 72 is drawn from the touched location 73 to the center of the QR code. The angle between this virtual line 72 and the 0 degrees reference 19 is calculated and is equivalent to the rotation angle as obtained using the embodiment where the user has turned the capturing device to point an arrow at the selected icon.

For the 1-icon 75 the range of rotation angles that are considered valid is from 22.5 degrees to 67.5 degrees. The touched area shown results in a detected rotation angle of approximately 45 degrees, which is a valid rotation angle and would, when presented to the server of the issuer of the QR code, result in the information associated to the 1-icon 74 to be send to the capturing device.

As the concept of determining the rotation angle using the touch screen no longer needs a fixed 0 degrees on the capturing device the 0 degrees reference can solely be determined based on the position detection patterns. The rotation angle is the angle between the virtual line 72 and the 0 degrees reference drawn through the top position detection patterns.

It is obvious that also the two left position detection patterns of the QR code can be used for this purpose, only requiring either a different interpretation of the angle values by the server or a compensation for introduction of a 90 degrees offset by the capturing device.

When only using the rotation angle to distinguish between icons, a set of pie shaped zones is created as explained in FIGS. 13 and 14. When also using the distance between the touched location 73 and the center of the QR code, expressed in the units of distance derived from the QR code as explained in FIGS. 15 and 16, the icons can be more accurately distinguished. The issuer of the QR code determines the position of the icons associated to the QR code and thus not only knows which icons are associated to each range of rotation angles, but also knows the size and distance of the icons relative to the center of the QR code. Using both angle and distance the issuer's server can detected that a user has not touched the icon but has touched outside an icon thus providing a more accurate validation of the user's choice.

Figure 18:
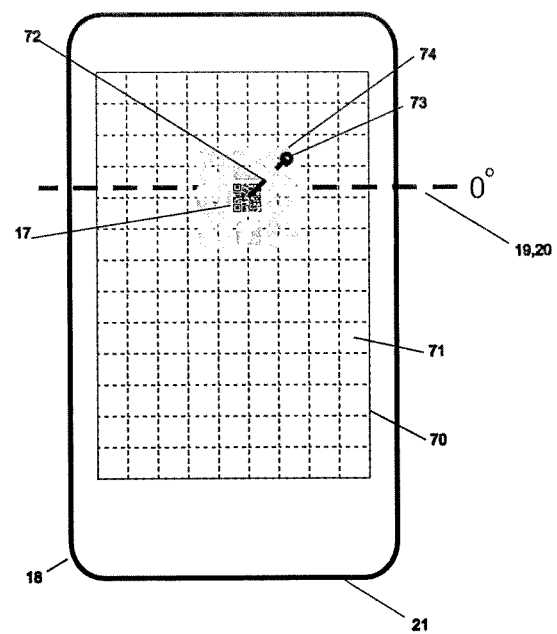
FIG. 18 shows a coordination lattice as derived from the orientation and dimension of a captured QR code.

FIG. 18 shows a coordination lattice as derived from the orientation and dimension of a captured QR code.

In FIG. 18 the QR code is surrounded by more icons, to illustrate that the capturing device 18 need not be aware of the icons and that the icons can be positioned at unequal distances from the center of the QR code. Also, FIG. 18 illustrates that the magnification of the QR code is irrelevant for proper detection of the touched area and subsequent determination of the rotation angle and distance.

As the QR code 17 is significantly smaller in FIG. 18 than in FIG. 17, unit of distance, being derived from the QR code automatically is also smaller, in direct proportion to the QR code 17. Thus, as shown, the grid 70 is also smaller as it is scaled along with the QR code 17. The rotation angle is not affected by the scaling. The distance from the touched location 73 (the user intending to select icon 74, to the center of the QR code 17, when expressed in units of distance derived from the QR code 17 also remains unchanged. This way, regardless of the magnification of the captured QR code 17, the distance and angle information sent to the issuer's server remains unchanged and as such the server does not need to compensate for any changes in magnification while capturing the QR code.

Figure 19:
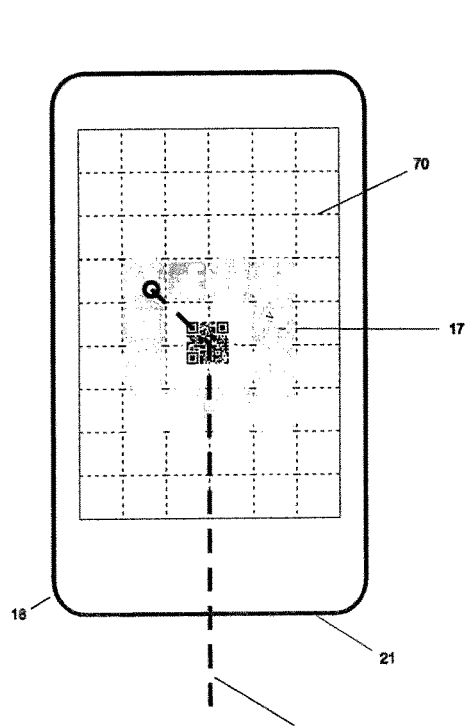
FIG. 19 shows a coordination lattice as derived from the orientation and dimension of a captured QR code.

FIG. 19 shows a coordination lattice as derived from the orientation and dimension of a captured QR code.

Figure 20:
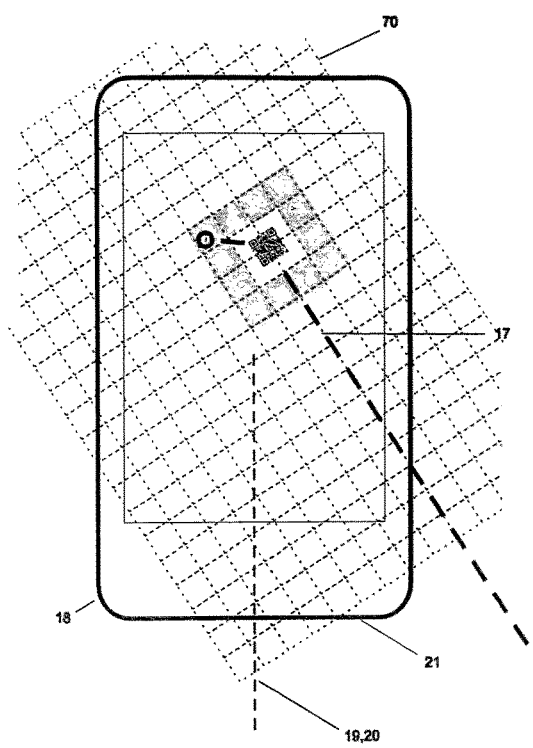
FIG. 20 shows a rotated coordination lattice as derived from the orientation and dimension of a captured QR code.

In FIG. 19 the number of icons is increased to 12. This reduces the range of the rotation angle associated with each icon. However it was found that the rotation angle can be determined to a 1 degree accuracy and thus more icons can easily be distinguished reliably. FIG. 20 shows a rotated coordination lattice as derived from the orientation and dimension of a captured QR code.

In FIG. 20 the capturing device is rotated relative to the QR code being captured resulting in a different orientation on the display.

This poses however no problem, as the orientation of the QR code is established using the Position Detection Patterns of the QR code. Using this orientation together with the unit of distance derived from the QR code, the capturing device is able to establish a coordinate system that is at an angle relative to the display, but is aligned and scaled with the rotated QR code as shown in FIG. 19.

Once this coordinate system has been established, the touched location can easily be expressed, as discussed above, as an angle between the virtual line drawn through the touched location and the center of the QR code, and the distance between the touched location and the center of the QR code.

Figure 21:
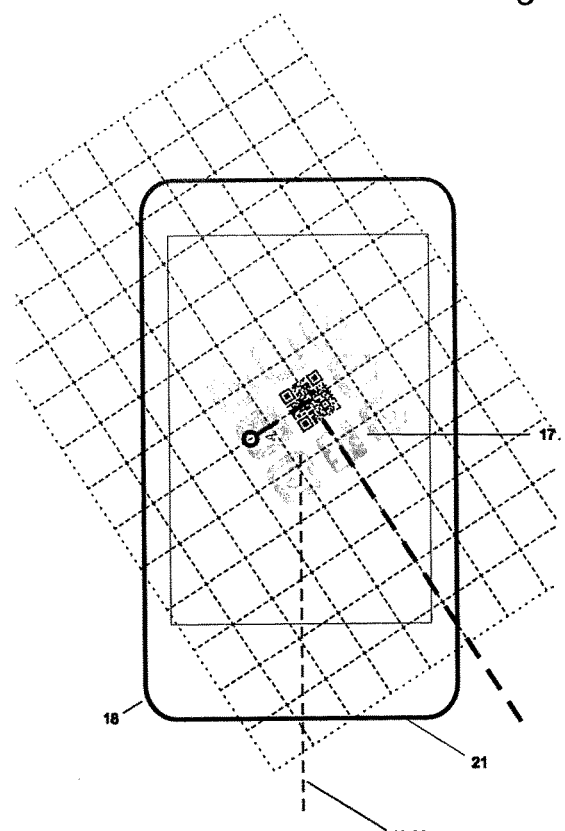
FIG. 21 shows a rotated coordination lattice as derived from the orientation and dimension of a captured QR code.

Thus, the parameters rotation angle and distance are determined independently of the angle and magnification at which the QR code is captured. The parameters sent to the issuers server are thus also independent of the angle and magnification at which the QR code is captured, ensuring an easy to use intuitive interface between the issuer's server and the user. FIG. 21 shows a rotated coordination lattice as derived from the orientation and dimension of a captured QR code.

In FIG. 21 the orientation of the QR code is identical to the orientation depicted in FIG. 20, but the magnification differs as the QR code is larger in FIG. 21 than in FIG. 20. As the unit of distance scales together with the size of the QR code, the grid in FIG. 21 is scaled to be larger as well, in direct relation to the increase in size of the QR code itself.

Figure 22:
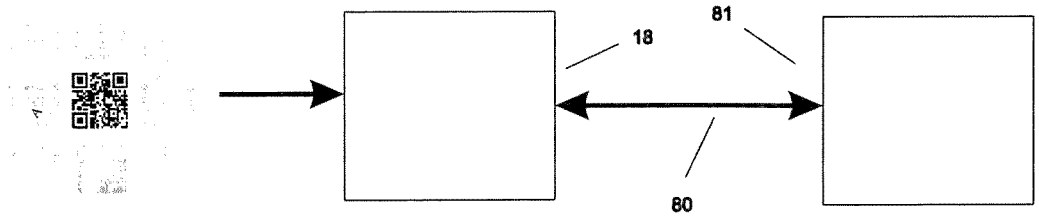
FIG. 22 shows an information server according to the invention.

Thus, as can be seen, the distances between the icons and the center of the QR code remains the same when expressed in the units of distance derived from the size of the QR code. FIG. 22 shows an information server according to the invention.

The information server 81 comprises a processor for processing incoming requests for information and storage means such as hard disks or memory for holding the information to be provided by the server.

When a capturing device according to the invention captures a QR code with a URL it uses this URL information to request the desired information. Assuming that the basic URL to access this information is:

www.mywebsite.com/product1 the capturing device attaches the angle as explained for instance in FIG. 12:

www.mywebsite.com/product1?angle=260 indicating that the information associated with the icon at an angle of 260 degrees is to be provided.

The capturing device 18 sends this URL to the communication connection 80 to the information server 81. The communication connection 80 can be a direct connection such as a local network but can also be the internet.

Upon reception, the information server 81 parses the string, extracts the value of the angle parameter and uses this angle parameter to select the associated information. Subsequently the information server 81 sends the requested information, via the communication connection 80, to the capturing device 18 for displaying or processing. The parsing of the string and the extraction of the parameters can be handled in scripts on the information server, often written in the programming language Perl or Python. When the information server receives:

http://www.qtwist.com? angle=209 the PHP/Python/Perl script on the information server extracts the value of the variable 'angle' using for instance the $_GET command.

The value of 'angle' is subsequently used to control the destination of the request.

In the case of:

www.qtwist.com/product1?qtwist=10&angle=123&distance= 1.450&pressure=0.82 a PHP/Python/Perl script on the information server extracts the value of the variables 'qtwist', 'angle', 'distance' and 'pressure' using for instance the $_GET command.

The values of 'qtwist', 'angle', 'distance' and 'pressure' are subsequently used to control the destination of the request.

If it is desirable to avoid sending unexpected parameters to an information server, the method for requesting the information can be improved. To this end the URL stored in the QR code is used to indicate whether additional parameters are to be appended or not.

When the parameter 'qtwist' is present, the additional parameters such as angle and/or distance are appended. This ensures that a capturing device according to the invention can determine whether a regular QR code according to the prior art has been captured (and no parameters should be appended) or that a QR code according to the invention has been scanned (and the parameters should be determined and appended). Thus, when the following example URL is extracted from the captured QR code:

www.mywebsite.com/product1?qtwist=0 the capturing device appends the various parameters:

www.mywebsite.com/product1?qtwist=0&angle=123&distance= 1.450&pressure=0.82

Figure 23:
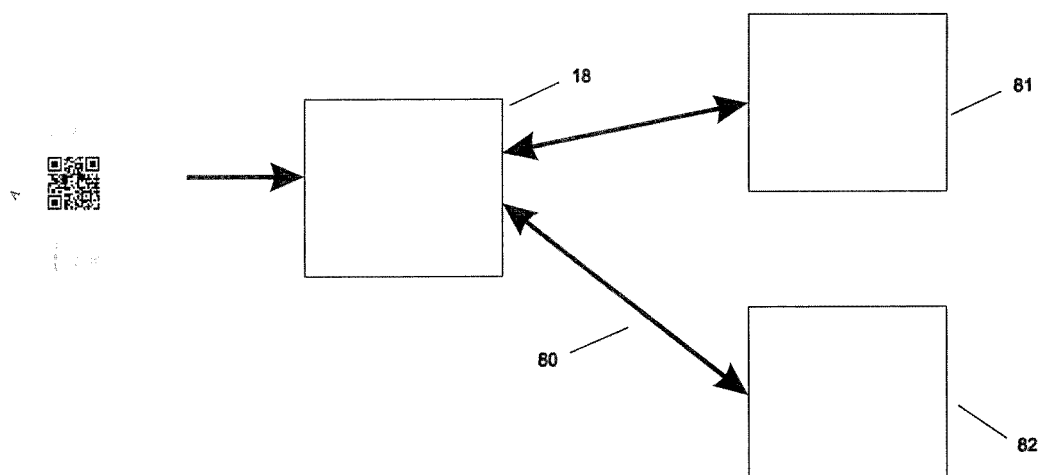
FIG. 23 shows an information server according to the invention forwarding to another information server.

FIG. 23 shows an intermediate information server according to the invention forwarding to another information server.

The operator of the information server 81 may hesitate to add scripts to his existing information server as that would often involve modification of an existing stable information server.

To avoid the modification of the existing information server an intermediate information server 82 is used to parse the requests coming from the capturing device.

When a capturing device according to the invention captures a QR code with a URL it uses this URL information to request the desired information. Assuming that the basic URL to access this information is:

www.mywebsite.com/product1?qtwist=0 the capturing device attaches the angle as explained for instance in FIG. 12:

www.mywebsite.com/product1?qtwist=0&angle=123&distance= 1.450&pressure=0.82&server=twistserver indicating that the information associated with the icon at an angle of 123 degrees and at a distance of 1.450 units of distance is to be provided.

The capturing device 18 sends this URL to the communication connection 80 to the intermediate information server 82 at a predefined address which is either fixed (www.qtwist.com) or created from a parameter in the URL (the server parameter can be appended and used to create the server's address 'www'+twistserver+'.com'). The communication connection 83 can be a direct connection such as a local network but can also be the internet.

Upon reception, the intermediate information server 82 parses the string, extracts the value of the angle and distance parameter and uses this angle and distance parameter to determine what information is requested. The intermediate information server 82 then creates, for instance from a table, the correct URL for requesting the information from the information server 81 and redirects the capturing device 18 to this URL. Subsequently the information server 81 sends the requested information, via the communication connection 80, to the capturing device 18 for displaying or processing. The parsing of the string and the extraction of the parameters can be handled in scripts on the intermediate information server 82, often written in the programming language Perl or Python.

The intermediate server 82 thus can be customized for interpretation of the URL and allow the retrieval of the information from other servers 81 where the information is already present anyhow, thus avoiding the duplication of the data and associated problems of keeping information on different servers 81, 82 in sync with each other.

Figure 24:
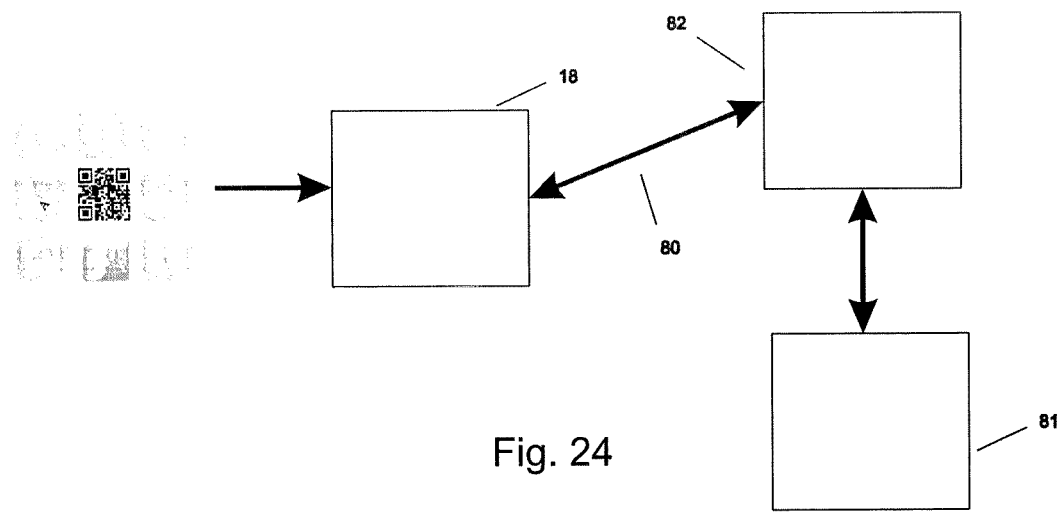
FIG. 24 shows an intermediate information server according to the invention.

FIG. 24 shows an intermediate information server according to the invention.

In this case the information server 82 receiving the request for information does parse the received URL but does not locally store (all) information to be provided. The intermediate information server 82 thus has a connection to a storage server 81 for retrieving the requested information. After receiving the requested information from the storage server 81, the intermediate server 82 provides the requested information to the capturing device.

The intermediate server 82 thus can be customized for interpretation of the URL and retrieve the information from other servers 81 where the information is already present anyhow, thus avoiding the duplication of the data and associated problems of keeping information on different servers 81, 82 in sync with each other.

Figure 25:
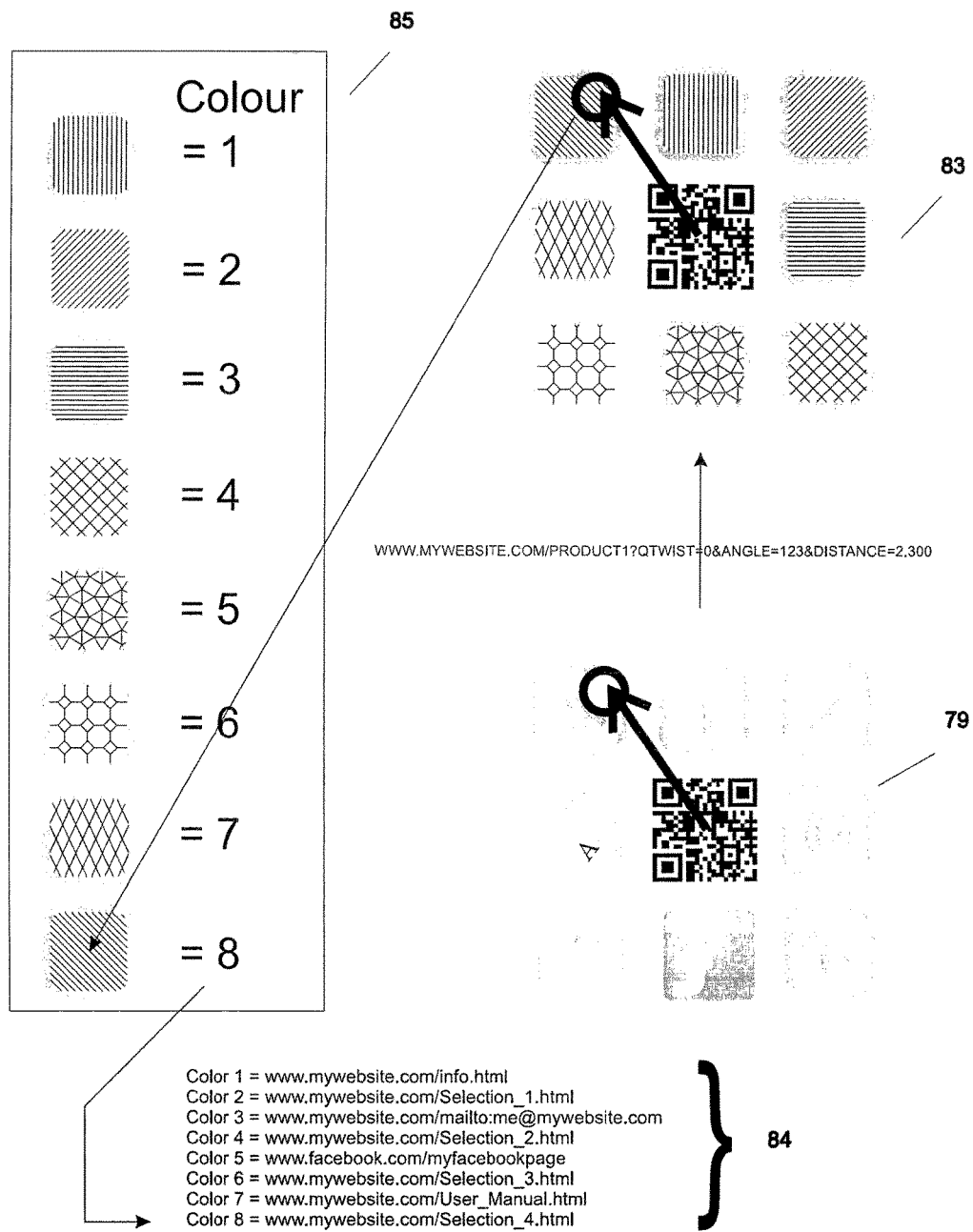
FIG. 25 shows the method of providing information using an image to determine which information is desired based on the received coordinates.

FIG. 25 shows the method of providing information using an image to determine which information is desired based on the received coordinates.

In order to enable easy automated translation of the selected area of the captured image 79 to the location of the desired information, a translation image 83 is used.

First the user captures the printed image 79 and selects an icon by touching the icon anywhere inside the icon. This results in a URL such as:

WWW.MYWEBSITE.COM/PRODUCT1?QTWIST=0&ANGLE=123&DISTANCE=2.300

This URL is used to contact the information server where the translation image 83 is stored. The information server extracts the angle and distance parameter values and uses these to select a pixel of the translation image 83 that thus (approximately) corresponds to the selected pixel in the captured image 79. The value of the selected pixel of the translation image 83 (for instance color or luminance) is retrieved. In the example shown there are 8 icons and in the translation image 83 each one of the icon areas has a different color. This means that in the translation image 83 the original pixel values in each icon area are lost and replaced by a color value.

Because of restrictions in the publication of a patent, in FIGS. 25 and 26 the various colors are indicated by various hatching patterns replacing the icons. Thus a hatching pattern indicates that the color values of the pixels in that area of the translation image 83 represent the same color.

In the translation image 83 the outlines and dimension of the QR code plus icons is retained but the image information is lost. Having obtained the color value of the pixel, the information server looks up the associated link in a translation table 84 and uses this link to retrieve the desired information and provide this desired information to the capturing device. As the translation image 83 can be easily created using the information used to create the printed image 79, a one to one relation can be easily established.

This method allows a large degree of freedom in the artistic design and shape of the icons and their placement relative to the QR code and relative to each other as each pixel in the printed image 79 has a corresponding translation pixel in the translation image 83. It thus provides, for each angle and distance combination automatically the appropriate translation. The consequence of this is that the software to handle the translation can be universal, i.e. independent of the actual QR code and the icons. All that needs to be provided to add the proper handling of another QR code is a translation image 83 and color to information translation table 84.

For example, when adding handling for another manufacturer/product the value of the qtwist parameter can indicate the manufacturer/product. For instance when qtwist=1778 the software uses this value to select a directory from which to use the translation table 84 and translation image 83. Thus, no program changes are needed to expand the number of products/manufacturers/information providers supported.

Instead of replacing the pixel values by colors in the translation image 83, it is also possible to leave the most significant bits intact, thus maintaining the optical recognizability of the image, and use the least significant bits of the pixels to store the value to be used with the translation table. When providing 8 icons, it is sufficient to use the 3 least significant bits to store the value to indicate which of the 8 entries in the translation table is to be selected.

FIG. 26 shows an information server using an image to determine which information is desired based on the received coordinates.

Several information server configurations have been disclosed in FIGS. 22, 23 and 24. In all configurations the information server that parses the URL can use the translation image as disclosed in FIG. 25. Upon receipt of the parameters the information server 82 retrieves from storage 85 the translation image and translation table and proceeds as explained in FIG. 25 to obtain the location of the desired information. The storage 85 of the translation image and translation table can be the same as the storage 42 of FIG. 9 where the information to be provided upon request is stored, or it may be a separate fast storage means for instance when access times dictate so to avoid delays in parsing the URL.

Since the software handling the parsing of the URL and the handling of the translation image and translation table can be implemented such that there is no need to change the software when adding products/manufacturers/information providers, the present invention is only limited by the amount of storage and processing speed of the information server, thus allowing easy scaling to large systems with many products/manufacturers/information providers being supported, yet limiting the traffic between capturing device and the information server(s).

The invention claimed is:

1. A method for selecting information represented by an icon of a plurality of icons associated with a QR code comprising:

capturing an image of the QR code and the icon of the plurality of icons, wherein each of the plurality of icons is separate from, and located adjacent to, the QR code;
displaying the captured image of the QR code and the icon on a touch screen;
determining a user's touch location on the touch screen being an indication of selection of the icon of the plurality of icons;
determining an orientation of the QR code;
determining a relative coordinate of the touch location relative to the location of the QR code;
forwarding the relative coordinate to an information providing server; and
receiving information related to the relative coordinate from the information providing server.

2. The method as claimed in claim 1 further comprising deriving a unit of distance from the captured image of the QR code;
wherein the step of determining the relative coordinate is based on the touch location, the angle between the touch location and the QR code, the rotation angle of the QR code, and the derived unit of distance.

3. The method as claimed in claim 2, wherein the relative coordinate is a polar coordinate.

4. The method as claimed in claim 3, wherein the polar coordinate comprises a distance expressed in the derived unit of distance from a predefined point of the QR code to the touch location.

5. The method as claimed in claim 2, wherein the relative coordinate is a Cartesian coordinate expressed in the derived unit of distance.

6. The method as claimed in claim 2 further comprising:
deriving a perspective correction information derived from the QR code; and
applying the perspective correction information to the captured image of the QR code before determining the relative coordinate.

7. A device for retrieving information represented by an icon of a plurality of icons associated with a QR code, the device comprising:
a capturing device for capturing an image of the QR code and the icon of the plurality of icons, wherein each of the plurality of icons is separate from, and located adjacent to, the QR code;
a touch screen for displaying the captured image of the QR code and the icon and for receiving a user's touch location on the touch screen being indicative of a selection of the icon of the plurality of icons;
a processor configured to determine:
an orientation of the QR code;
the touch location; and
a relative coordinate of the touch location relative to the location of the QR code; and
a communication interface for:
forwarding the relative coordinate to an information providing server identified by the QR code; and
receiving information related to the relative coordinate from the information providing server.

8. The device as claimed in claim 7, wherein the processor is further configured to:
derive a unit of distance from the captured image of the QR code; and
to determine the relative coordinate based on the touch location, the orientation of the QR code, and the derived unit of distance.

9. The device as claimed in claim 7, wherein the relative coordinate is a polar coordinate.

10. The device as claimed in claim 8, wherein the relative coordinate is a polar coordinate; and
wherein the polar coordinate comprises an angle relative to a predefined normal orientation of the QR code and a distance expressed in the derived unit of distance from a predefined point of the QR code.

11. The device as claimed in claim 8, wherein the relative coordinate is a Cartesian coordinate expressed in the derived unit of distance.

12. The device as claimed in claim 7 further comprising:
perspective correction means comprising perspective distortion detection means for deriving perspective correction information from the QR code; and
perspective distortion correction means for applying a perspective correction to the QR code based on the perspective correction information before determining the relative coordinate.

13. A system for retrieving information represented by an icon of a plurality of icons associated with a QR code having a pre-defined machine-recognizable coordinate system, the system comprising:
a capturing device for capturing an image of the QR code and the icon of the plurality of icons, wherein each of the plurality of icons is separate from, and located adjacent to, the QR code;
a touch screen for displaying the captured image of the QR code and the icon and for receiving a user's touch indicative of a selection of the icon of the plurality of icons;
memory that contains the machine-recognizable coordinate system of the QR code;
a processor configured to determine an orientation in the pre-defined machine-recognizable coordinate system of the QR code and to determine a coordinate in the pre-defined machine-recognizable coordinate system representing the selected icon of the plurality of icons based on an angle between the selected icon and the QR code; and
a communication interface for forwarding the coordinate to an information provider and receiving information represented by the selected icon from the information provider.

* * * * *